US012681275B2

(12) United States Patent
Yu et al.

(10) Patent No.: US 12,681,275 B2
(45) Date of Patent: Jul. 14, 2026

(54) CAMERA OPTICAL LENS

(71) Applicant: AAC Optics (Suzhou) Co., Ltd., Suzhou (CN)

(72) Inventors: Renlong Yu, Suzhou (CN); Shunda Zhou, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 379 days.

(21) Appl. No.: 18/409,758

(22) Filed: Jan. 10, 2024

(65) Prior Publication Data

US 2025/0044555 A1 Feb. 6, 2025

(51) Int. Cl.
| | |
|---|---|
| *G02B 13/00* | (2006.01) |
| *G02B 9/62* | (2006.01) |
| *G02B 13/06* | (2006.01) |

(52) U.S. Cl.
CPC ........... *G02B 13/0045* (2013.01); *G02B 9/62* (2013.01); *G02B 13/06* (2013.01)

(58) Field of Classification Search
CPC ................................................ G02B 13/0045
See application file for complete search history.

(56) References Cited

U.S. PATENT DOCUMENTS

| | | | | |
|---|---|---|---|---|
| 2019/0129146 A1* | 5/2019 | Wu | ..................... | G02B 13/0045 |
| 2025/0044553 A1* | 2/2025 | Liao | ........................ | G02B 13/06 |

* cited by examiner

*Primary Examiner* — Edmond C Lau
(74) *Attorney, Agent, or Firm* — Wiersch Law Group

(57) ABSTRACT

Provided is a camera optical lens, including first, second and fifth lenses having negative refractive power, third, fourth and sixth lenses having positive refractive power. The first and third lenses are made of glass material. Refractive index of third lens is n3, focal length of first lens is f1, focal length of second lens is f2, on-axis thickness of fifth lens is d9, on-axis distance between fifth and sixth lenses is d10, central curvature radii of object-side and image-side surfaces of second lens are R3 and R4, total track length, image height, and field of view of the camera optical lens is TTL, IH, and FOV, respectively, and following relations are satisfied: n3≥1.70; 1.00≤f2/f1≤2.00; 1.30≤d10/d9≤4.00; 1.70≤R4/R3≤4.00; 0.02≤TTL/(IH*FOV)≤0.03. The camera optical lens has excellent optical characteristics and characteristics of large aperture, ultra-wide-angle, and miniaturization, and is particularly suitable for various kinds of camera lens assemblies.

10 Claims, 28 Drawing Sheets

CAMERA OPTICAL LENS

TECHNICAL FIELD

The present disclosure relates to the field of optical lens and, in particular, to a camera optical lens suitable for handheld terminal devices such as smart phone and digital camera, and camera devices such as monitor, PC lens, vehicle-mounted lens and unmanned aerial vehicle.

BACKGROUND

In recent years, with the rise of various smart devices, there is increasing demand for miniaturized camera optical lens. Due to the reduction in pixel size of photosensitive device the and the development trend of the current electronic product with excellent function, lightweight and portable, the miniaturized camera optical lens with good imaging quality has become the mainstream on the current market. In order to achieve better imaging quality, a multi-lens structure is adopted. In addition, with the development of technology and the increasing diverse needs of users, as the pixel area of photosensitive device continues to reduce and the requirements on imaging quality continue to increase, a six-lens structure is gradually appeared in lens design. A wide-angle camera lens with excellent optical characteristics, a small volume, and sufficiently corrected aberrations is urgently desired.

SUMMARY

In view of the above problems, the present disclosure aims to provide a camera optical lens which not only has good optical performance, but also meets the design requirements of large aperture, ultra-wide-angle, and miniaturization.

In order to solve the above technical problems, an embodiment of the present disclosure provides a camera optical lens, including from an object side to an image side: a first lens having negative refractive power, a second lens having negative refractive power, a third lens having positive refractive power, a fourth lens having positive refractive power, a fifth lens having negative refractive power, and a sixth lens having positive refractive power. The first lens is made of glass material, and the third lens is made of glass material. A refractive index of the third lens is n3, a focal length of the first lens is f1, a focal length of the second lens is f2, an on-axis thickness of the fifth lens is d9, an on-axis distance from an image-side surface of the fifth lens to an object-side surface of the sixth lens is d10, a central curvature radius of an object-side surface of the second lens is R3, a central curvature radius of an image-side surface of the second lens is R4, a total track length of the camera optical lens is TTL, an image height of the camera optical lens is IH, a field of view of the camera optical lens is FOV, and the following relations are satisfied: n3≥1.70; 1.00≤f2/f1≤2.00; 1.30≤d10/d9≤4.00; 1.70≤R4/R3≤4.00; and 0.02≤TTL/(IH*FOV)≤0.03.

As an improvement, a central curvature radius of the object-side surface of the sixth lens is R11, a central curvature radius of an image-side surface of the sixth lens is R12, and the following relation is satisfied: −3.50≤(R11+R12)/(R11−R12)≤−1.30.

As an improvement, a focal length of the camera optical lens is f, a focal length of the third lens is f3, and the following relation is satisfied: 1.10≤f3/f≤1.50.

As an improvement, an object-side surface of the first lens is convex at a paraxial position, and an image-side surface of the first lens is concave at the paraxial position. The focal length of the camera optical lens is f, a central curvature radius of the object-side surface of the first lens is R1, a central curvature radius of the image-side surface of the first lens is R2, an on-axis thickness of the first lens is d1, and the following relations are satisfied:

$$-3.69 \le f1/f \le -0.98; 0.52 \le (R1 + R2)/(R1 - R2) \le 2.29;$$

$$\text{and } 0.02 \le d1/TTL \le 0.16.$$

As an improvement, the object-side surface of the second lens is concave at a paraxial position, and the image-side surface of the second lens is convex at the paraxial position. The focal length of the camera optical lens is f, an on-axis thickness of the second lens is d3, and the following relations are satisfied: −7.07≤f2/f≤−1.27; −7.70≤(R3+R4)/(R3−R4)≤−1.12; and 0.02≤d3/TTL≤0.09.

As an improvement, an object-side surface of the third lens is convex at a paraxial position, and an image-side surface of the third lens is convex at the paraxial position. A central curvature radius of the object-side surface of the third lens is R5, a central curvature radius of the image-side surface of the third lens is R6, an on-axis thickness of the third lens is d5, and the following relations are satisfied: −0.44≤(R5+R6)/(R5−R6)≤−0.05; and 0.03≤d5/TTL≤0.12.

As an improvement, an object-side surface of the fourth lens is convex at a paraxial position, and an image-side surface of the fourth lens is convex at the paraxial position. The focal length of the camera optical lens is f, a focal length of the fourth lens is f4, a central curvature radius of the object-side surface of the fourth lens is R7, a central curvature radius of the image-side surface of the fourth lens is R8, an on-axis thickness of the fourth lens is d7, and the following relations are satisfied: 0.53≤f4/f≤1.86; 0.20≤(R7+R8)/(R7−R8)≤0.69; and 0.06≤d7/TTL≤0.20.

As an improvement, an object-side surface of the fifth lens is concave at a paraxial position, and the image-side surface of the fifth lens is concave at the paraxial position. The focal length of the camera optical lens is f, a focal length of the fifth lens is f5, a central curvature radius of the object-side surface of the fifth lens is R9, a central curvature radius of the image-side surface of the fifth lens is R10, and the following relations are satisfied:

$$-3.15 \le f5/f \le -0.78; -1.73 \le (R9 + R10)/(R9 - R10) \le -0.51;$$

$$\text{and } 0.02 \le d9/TTL \le 0.11.$$

As an improvement, the object-side surface of the sixth lens is convex at a paraxial position, and an image-side surface of the sixth lens is concave at the paraxial position. The focal length of the camera optical lens is f, a focal length of the sixth lens is f6, an on-axis thickness of the sixth lens is d11, and the following relations are satisfied: 1.48≤f6/f≤6.86; and 0.06≤d11/TTL≤0.22.

As an improvement, a field of view of the camera optical lens is FOV, and the following relation is satisfied: FOV≥120°.

The present disclosure has the following beneficial effects: the camera optical lens according to the present disclosure has excellent optical characteristics and characteristics of large aperture, ultra-wide-angle, and miniaturization, and is particularly suitable for camera lens assembly, composed of high pixel CCD, CMOS and other camera elements, of mobile phone, WEB camera lens, and camera lens for unmanned aerial vehicle.

BRIEF DESCRIPTION OF DRAWINGS

In order to better describe the technical solutions in the embodiments of the present disclosure, the drawings which are needed in the description of the embodiments will be briefly introduced as follows. It is appreciated that, the drawings in the following description are only some of the embodiments of the present disclosure, and for those of ordinarily skilled in the art, other drawings can also be obtained in accordance with these drawings without any creative effort.

DESCRIPTION OF EMBODIMENTS

To make the objects, technical solutions and advantages of the present disclosure more clear and complete, embodiments of the present disclosure will be described in detail in conjunction with the drawings hereinafter. However, those of ordinary skill in the art will appreciate that in various embodiments of the present disclosure, the technical details are set forth for the reader to better understand the present disclosure. However, even without these technical details and various variations and modifications based on the following embodiments, the technical solutions claimed in the present disclosure can still be implemented.

First Embodiment

Figure 1:
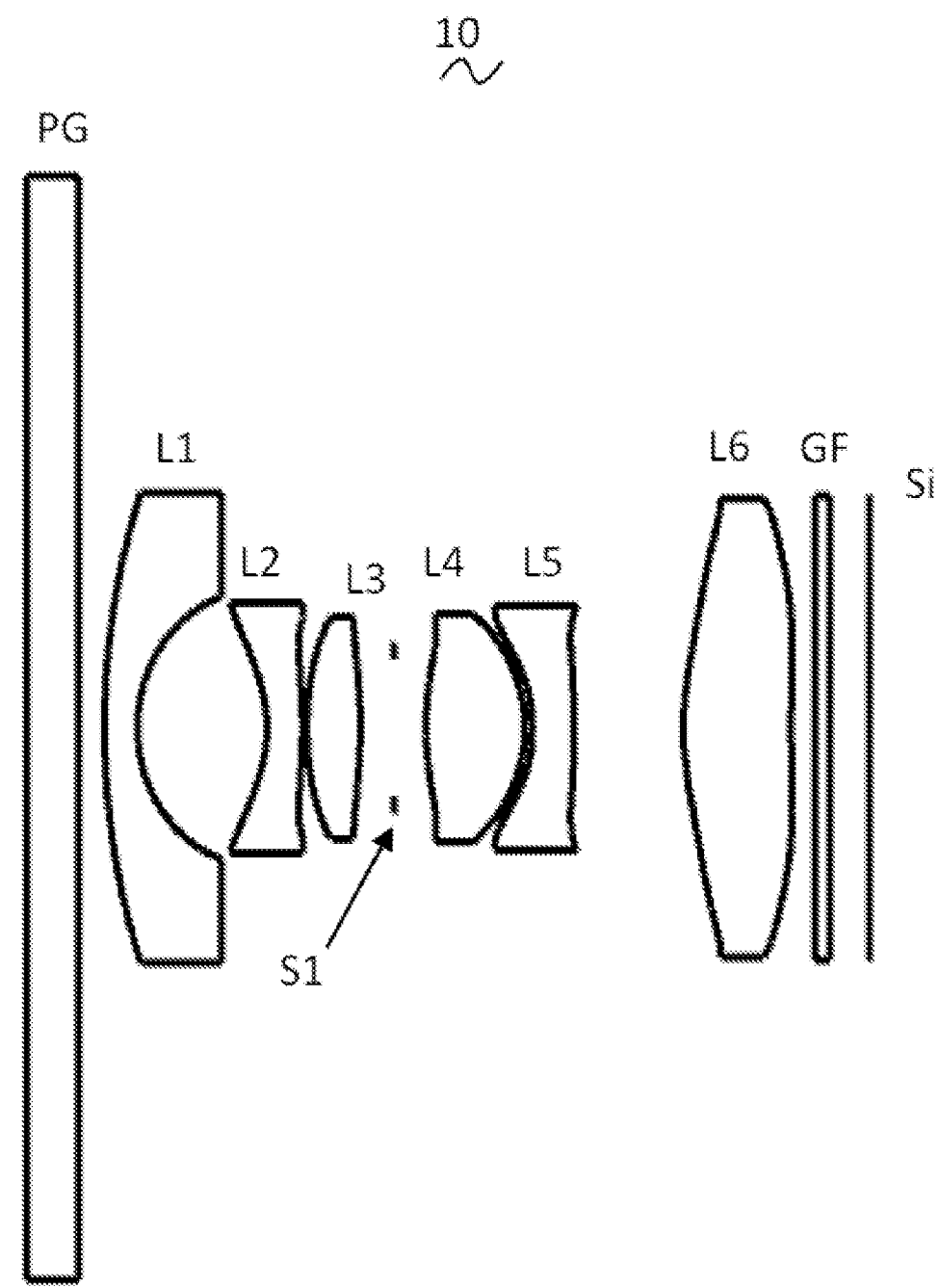
FIG. 1 is a structural schematic diagram of a camera optical lens according to a first embodiment of the present disclosure.

Referring to the drawings, the present disclosure provides a camera optical lens 10. FIG. 1 shows a camera optical lens 10 according to the first embodiment of the present disclosure, and the camera optical lens 10 includes six lenses. The camera optical lens 10 includes, from an object side to an image side: protective glass PG, a first lens L1, a second lens L2, a third lens L3, an aperture S1, a fourth lens L4, a fifth lens L5, and a sixth lens L6. An optical element such as grating filter GF may be provided between the sixth lens L6 and an image plane Si.

In this embodiment, both an object-side surface and an image-side surface of the first lens L1 are spherical surfaces, and the surfaces of the other lenses are aspheric surfaces. Selecting some lenses and designing them as spherical lenses can reduce manufacturing difficulty.

In this embodiment, the first lens L1 is made of glass material, the second lens L2 is made of plastic material, the third lens L3 is made of glass material, the fourth lens L4 is made of plastic material, the fifth lens L5 is made of plastic material, and the sixth lens L6 is made of plastic material. The appropriate addition of glass lenses can improve the optical performance of the system. In other alternative embodiments, each lens may also be made of other materials.

In this embodiment, a refractive index of the third lens L3 is defined as n3, and the following relation is satisfied: n3≥1.70, which specifies the range of the refractive index n3 of the third lens L3. Within the range, materials with high refractive index are adopted, which is favorable to improving imaging quality.

In this embodiment, a focal length of the first lens L1 is defined as f1, a focal length of the second lens L2 is defined as f2, and the following relation is satisfied: 1.00≤f2/f1≤2.00, which specifies the ratio of the focal length f1 of the first lens L1 to the focal length f2 of the second lens L2. Within this range, the focal length of the first lens is close to the focal length of the second lens, which is favorable for the smooth transition of light and can effectively reduce chromatic aberration, so that |LC|≤4.5 µm.

In this embodiment, an on-axis thickness of the fifth lens L5 is defined as d9, an on-axis distance from an image-side surface of the fifth lens L5 to an object-side surface of the sixth lens L6 is defined as d10, and the following relation is satisfied: 1.30≤d10/d9≤4.00, which specifies the ratio of the on-axis distance d10 from the image-side surface of the fifth lens L5 to the object-side surface of the sixth lens L6 to the on-axis thickness d9 of the fifth lens L5. Within this range, air gaps are distributed, which is favorable for the smooth transition of light and can improve imaging quality.

In this embodiment, a central curvature radius of an object-side surface of the second lens L2 is defined as R3, a central curvature radius of an image-side surface of the second lens L2 is defined as R4, and the following relation is satisfied: 1.70≤R4/R3≤4.00, which specifies the shape of the second lens L2. Within the conditional range, the field curvature of the system can be effectively balanced, so that the field curvature offset of the central field of view is less than 0.01 mm.

In this embodiment, a total track length of the camera optical lens 10 is defined as TTL, an image height of the camera optical lens 10 is defined as IH, a field of view in a diagonal direction of the camera optical lens 10 is FOV, and the following relation is satisfied: 0.02≤TTL/(IH*FOV)≤0.03, which specifies the ratio of the total track length TTL of the camera optical lens 10 to the product of the image height IH and the field of view FOV thereof. Within the conditional range, it is favorable to achieving miniaturization and wide-angle of the system.

In this embodiment, a central curvature radius of the object-side surface of the sixth lens L6 is defined as R11, a central curvature radius of an image-side surface of the sixth lens L6 is defined as R12, and the following relation is satisfied: −3.50≤(R11+R12)/(R11−R12)≤−1.30, which specifies the shape of the sixth lens L6, and it is favorable for the smooth transition of light and can improve imaging quality.

In this embodiment, a focal length of the camera optical lens 10 is defined as f, a focal length of the third lens L3 is defined as f3, and the following relation is satisfied: 1.10≤f3/f≤1.50, which specifies the ratio of the focal length f3 of the third lens L3 to the focal length f of the camera optical lens 10. Within this range, by allocating the refractive power of the system reasonably, the system has better imaging quality and lower sensitivity.

In this embodiment, the object-side surface of the first lens L1 is convex at a paraxial position, the image-side surface of the first lens L1 is concave at the paraxial position, and the first lens L1 has negative refractive power. In other alternative embodiments, the object-side surface and the image-side surface of the first lens L1 may also be configured to be other concave and convex distributions.

The focal length of the camera optical lens 10 is defined as f, a focal length of the first lens L1 is defined as f1, and the following relation is satisfied: −3.69≤f1/f≤−0.98, which specifies the ratio of the focal length f1 of the first lens L1 to the focal length f of the camera optical lens 10. Within this range, it is favorable to achieving ultra-wide-angle. Optionally, the following relation is satisfied: −2.31≤f1/f≤−1.23.

A central curvature radius of the object-side surface of the first lens L1 is defined as R1, a central curvature radius of the image-side surface of the first lens L1 is defined as R2, and the following relation is satisfied: 0.52≤(R1+R2)/(R1−R2)≤2.29. By controlling the shape of the first lens L1 reasonably, the first lens L1 can effectively correct the spherical aberration of the system. Optionally, the following relation is satisfied: 0.83≤(R1+R2)/(R1−R2)≤1.83.

An on-axis thickness of the first lens L1 is defined as d1, the total track length of the camera optical lens 10 is defined as TTL, and the following relation is satisfied: 0.02≤d1/TTL≤0.16. Within this range, it is favorable to achieving miniaturization. Optionally, the following relation is satisfied: 0.03≤d1/TTL≤0.13.

In this embodiment, the object-side surface of the second lens L2 is concave at the paraxial position, the image-side surface of the second lens L2 is convex at the paraxial position, and the second lens L2 has negative refractive power. In other alternative embodiments, the object-side surface and the image-side surface of the second lens L2 may also be configured to be other concave and convex distributions.

The focal length of the camera optical lens 10 is defined as f, a focal length of the second lens L2 is defined as f2, and the following relation is satisfied: −7.07≤f2/f≤−1.27. By controlling the negative refractive power of the second lens L2 within a reasonable range, it is favorable to correcting the aberration of the optical system. Optionally, the following relation is satisfied: −4.42≤f2/f≤−1.59.

A central curvature radius of the object-side surface of the second lens L2 is defined as R3, a central curvature radius of the image-side surface of the second lens L2 is defined as R4, and the following relation is satisfied: −7.70≤(R3+R4)/(R3−R4)≤−1.12, which specifies the shape of the second lens L2. Within this range, with the development of ultra-thin and wide-angle, it is favorable to correcting the aberration of the off-axis angle. Optionally, the following relation is satisfied: −4.81≤(R3+R4)/(R3−R4)≤−1.40.

An on-axis thickness of the second lens L2 is defined as d3, the total track length of the camera optical lens 10 is defined as TTL, and the following relation is satisfied: 0.02≤d3/TTL≤0.09. Within this range, it is favorable to achieving miniaturization. Optionally, the following relation is satisfied: 0.04≤d3/TTL≤0.07.

In this embodiment, an object-side surface of the third lens L3 is convex at the paraxial position, the image-side surface of the third lens L3 is convex at the paraxial position, and the third lens L3 has positive refractive power. In other alternative embodiments, the object-side surface and the image-side surface of the third lens L3 may also be configured to be other concave and convex distributions.

A central curvature radius of the object-side surface of the third lens L3 is defined as R5, a central curvature radius of the image-side surface of the third lens L3 is defined as R6, and the following relation is satisfied: −0.44≤(R5+R6)/(R5−R6)≤−0.05, which specifies the shape of the third lens L3. Within this range, the degree of deflection of light can be reduced, and the chromatic aberration can be effectively corrected. Optionally, the following relation is satisfied: −0.28≤(R5+R6)/(R5−R6)≤−0.07.

An on-axis thickness of the third lens L3 is defined as d5, the total track length of the camera optical lens 10 is TTL, and the following relation is satisfied: 0.03≤d5/TTL≤0.12. Within the conditional range, it is favorable to achieving miniaturization. Optionally, the following relation is satisfied: 0.05≤d5/TTL≤0.10.

In this embodiment, an object-side surface of the fourth lens L4 is convex at the paraxial position, an image-side surface of the fourth lens L4 is convex at the paraxial position, and the fourth lens L4 has positive refractive power. In other alternative embodiments, the object-side surface and the image-side surface of the fourth lens L4 may also be configured to be other concave and convex distributions.

The focal length of the camera optical lens 10 is defined as f, a focal length of the fourth lens L4 is defined as f4, and the following relation is satisfied: $0.53 \leq f4/f \leq 1.86$. By allocating the refractive power reasonably, the system has better imaging quality and lower sensitivity. Optionally, the following relation is satisfied: $0.85 \leq f4/f \leq 1.49$.

A central curvature radius of the object-side surface of the fourth lens L4 is defined as R7, a central curvature radius of the image-side surface of the fourth lens L4 is defined as R8, and the following relation is satisfied: $0.20 \leq (R7+R8)/(R7-R8) \leq 0.69$, which specifies the shape of the fourth lens L4. Within this range, with the development of ultra-thin and long-focus, it is favorable to correcting the aberration of the off-axis angle. Optionally, the following relation is satisfied: $0.32 \leq (R7+R8)/(R7-R8) \leq 0.55$.

An on-axis thickness of the fourth lens L4 is defined as d7, the total track length of the camera optical lens 10 is TTL, and the following relation is satisfied: $0.06 \leq d7/TTL \leq 0.20$. Within the conditional range, it is favorable to achieving miniaturization. Optionally, the following relation is satisfied: $0.09 \leq d7/TTL \leq 0.16$.

In this embodiment, an object-side surface of the fifth lens L5 is concave at the paraxial position, the image-side surface of the fifth lens L5 is concave at the paraxial position, and the fifth lens L5 has negative refractive power. In other alternative embodiments, the object-side surface and the image-side surface of the fifth lens L5 may also be configured to be other concave and convex distributions.

The focal length of the camera optical lens 10 is defined as f, a focal length of the fifth lens L5 is defined as f5, and the following relation is satisfied: $-3.15 \leq f5/f \leq -0.78$. By allocating the refractive power reasonably, the system has better imaging quality and lower sensitivity. Optionally, the following relation is satisfied: $-1.97 \leq f5/f \leq -0.97$.

A central curvature radius of the object-side surface of the fifth lens L5 is defined as R9, a central curvature radius of the image-side surface of the fifth lens L5 is defined as R10, and the following relation is satisfied: $-1.73 \leq (R9+R10)/(R9-R10) \leq -0.51$, which specifies the shape of the fifth lens L5. Within this range, with the development of ultra-thin and wide-angle, it is favorable to correcting the aberration of the off-axis angle. Optionally, the following relation is satisfied: $-1.08 \leq (R9+R10)/(R9-R10) \leq -0.64$.

An on-axis thickness of the fifth lens L5 is defined as d9, the total track length of the camera optical lens 10 is TTL, and the following relation is satisfied: $0.02 \leq d9/TTL \leq 0.11$. Within the conditional range, it is favorable to achieving miniaturization. Optionally, the following relation is satisfied: $0.04 \leq d9/TTL \leq 0.09$.

In this embodiment, the object-side surface of the sixth lens L6 is convex at the paraxial position, the image-side surface of the sixth lens L6 is concave at the paraxial position, and the sixth lens L6 has positive refractive power. In other alternative embodiments, the object-side surface and the image-side surface of the sixth lens L6 may also be configured to be other concave and convex distributions.

The focal length of the camera optical lens 10 is defined as f, a focal length of the sixth lens L6 is defined as f6, and the following relation is satisfied: $1.48 \leq f6/f \leq 6.86$. By allocating the refractive power reasonably, the system has better imaging quality and lower sensitivity. Optionally, the following relation is satisfied: $2.37 \leq f6/f \leq 5.49$.

An on-axis thickness of the sixth lens L6 is defined as d11, the total track length of the camera optical lens 10 is TTL, and the following relation is satisfied: $0.06 \leq d11/TTL \leq 0.22$. Within the conditional range, it is favorable to achieving miniaturization. Optionally, the following relation is satisfied: $0.10 \leq d11/TTL \leq 0.18$.

In this embodiment, a field of view of the camera optical lens is FOV, and the following relation is satisfied: $FOV \geq 120°$, which is favorable to achieving ultra-wide-angle.

In this embodiment, an aperture value FNO of the camera optical lens 10 is less than or equal to 2.40, thereby achieving a large aperture and good imaging performance of the camera optical lens 10.

The camera optical lens 10 not only has good optical performance, but also meets the design requirements of large aperture, ultra-wide-angle, and miniaturization. According to the characteristics of the camera optical lens 10, it is particularly suitable for camera lens assembly, composed of high pixel CCD, CMOS and other camera elements, of mobile phone, WEB camera lens, and camera lens for unmanned aerial vehicle.

The camera optical lens 10 of the present disclosure will be described below with examples. The reference signs recited in each example are shown below. The units of the focal length, the on-axis distance, the central curvature radius, the on-axis thickness, the inflection point position, and the arrest point position are mm.

TTL: total track length (the on-axis distance from the object-side of the first lens L1 to the image plane Si), the unit thereof is mm.

Aperture value FNO: the ratio of the effective focal length of the camera optical lens 10 to an entrance pupil diameter.

Optionally, the inflection point and the arrest point may be provided on the object-side surface and/or the image-side surface of the lens, so as to meet high-quality imaging requirements. The specific implementation is described below.

Table 1 and Table 2 show design data of the camera optical lens 10 according to the first embodiment of the present disclosure.

TABLE 1

|  | R |  | d |  | nd |  | vd |
| --- | --- | --- | --- | --- | --- | --- | --- |
| R0 | ∞ | T0= | 1.000 | ndg1 | 1.5168 | vg1 | 64.17 |
| R01 | ∞ | T01= | 0.500 |  |  |  |  |
| S1 | ∞ | d0= | −5.611 |  |  |  |  |
| R1 | 11.924 | d1= | 0.639 | nd1 | 1.6936 | v1 | 49.23 |
| R2 | 2.369 | d2= | 2.509 |  |  |  |  |
| R3 | −2.108 | d3= | 0.683 | nd2 | 1.5444 | v2 | 55.82 |
| R4 | −6.376 | d4= | 0.090 |  |  |  |  |
| R5 | 5.335 | d5= | 1.037 | nd3 | 1.8017 | v3 | 40.63 |
| R6 | −6.838 | d6= | 1.271 |  |  |  |  |
| R7 | 5.691 | d7= | 1.913 | nd4 | 1.5444 | v4 | 55.82 |
| R8 | −2.386 | d8= | 0.149 |  |  |  |  |
| R9 | −3.012 | d9= | 0.791 | nd5 | 1.6700 | v5 | 19.39 |
| R10 | 40.802 | d10= | 2.129 |  |  |  |  |
| R11 | 4.303 | d11= | 2.087 | nd6 | 1.5444 | v6 | 55.82 |
| R12 | 17.911 | d12= | 0.457 |  |  |  |  |
| R13 | ∞ | d13= | 0.300 | ndg2 | 1.5168 | vg2 | 64.17 |
| R14 | ∞ | d14= | 0.756 |  |  |  |  |

The meanings of each reference sign are as follows.

S1: aperture;

R: the curvature radius at the center of the optical surface;

R0: the central curvature radius of the object-side surface of the protective glass PG;

R01: the central curvature radius of the image-side surface of the protective glass PG;

R1: the central curvature radius of the object-side surface of the first lens L1;

R2: the central curvature radius of the image-side surface of the first lens L1;

R3: the central curvature radius of the object-side surface of the second lens L2;

R4: the central curvature radius of the image-side surface of the second lens L2;

R5: the central curvature radius of the object-side surface of the third lens L3;

R6: the central curvature radius of the image-side surface of the third lens L3;

R7: the central curvature radius of the object-side surface of the fourth lens L4;

R8: the central curvature radius of the image-side surface of the fourth lens L4;

R9: the central curvature radius of the object-side surface of the fifth lens L5;

R10: the central curvature radius of the image-side surface of the fifth lens L5;

R11: the central curvature radius of the object-side surface of the sixth lens L6;

R12: the central curvature radius of the image-side surface of the sixth lens L6;

R13: the central curvature radius of the object-side surface of the grating filter GF;

R14: the central curvature radius of the image-side surface of the grating filter GF;

T0: the on-axis thickness of the protective glass PG;

T01: the on-axis distance from the image-side surface of the protective glass PG to the object-side surface of the first lens L1;

d: the on-axis thickness of the lens or the on-axis distance between lenses;

d0: the on-axis distance from the aperture S1 to the object-side surface of the first lens L1;

d1: the on-axis thickness of the first lens L1;

d2: the on-axis distance from the image-side surface of the first lens L1 to the object-side surface of the second lens L2;

d3: the on-axis thickness of the second lens L2;

d4: the on-axis distance from the image-side surface of the second lens L2 to the object-side surface of the third lens L3;

d5: the on-axis thickness of the third lens L3;

d6: the on-axis distance from the image-side surface of the third lens L3 to the object-side surface of the fourth lens L4;

d7: the on-axis thickness of the fourth lens L4;

d8: the on-axis distance from the image-side surface of the fourth lens L4 to the object-side surface of the fifth lens L5;

d9: the on-axis thickness of the fifth lens L5;

d10: the on-axis distance from the image-side surface of the fifth lens L5 to the object-side surface of the sixth lens L6;

d11: the on-axis thickness of the sixth lens L6;

d12: the on-axis distance from the image-side surface of the sixth lens L6 to the object-side surface of the grating filter GF;

d13: the on-axis thickness of the grating filter GF;

d14: the on-axis distance from the image-side surface of the grating filter GF to the image plane Si;

nd: the refractive index of d-line (d-line is green light with a wavelength of 550 nm);

nd1: the refractive index of d-line of the first lens L1;

nd2: the refractive index of d-line of the second lens L2;

nd3: the refractive index of d-line of the third lens L3;

nd4: the refractive index of d-line of the fourth lens L4;

nd5: the refractive index of d-line of the fifth lens L5;

nd6: the refractive index of d-line of the sixth lens L6;

ndg1: the refractive index of d-line of the protective glass PG;

ndg2: the refractive index of d-line of the grating filter GF;

vd: Abbe number;

v1: the Abbe number of the first lens L1;

v2: the Abbe number of the second lens L2;

v3: the Abbe number of the third lens L3;

v4: the Abbe number of the fourth lens L4;

v5: the Abbe number of the fifth lens L5;

v6: the Abbe number of the sixth lens L6;

vg1: the Abbe number of the protective glass PG;

vg2: the Abbe number of the grating filter GF.

Table 2 shows aspheric surface data of each lens of the camera optical lens 10 according to the first embodiment of the present disclosure.

TABLE 2

| | Conic coefficient | Aspheric coefficient | | | | |
| --- | --- | --- | --- | --- | --- | --- |
| | k | A4 | A6 | A8 | A10 | A12 |
| R3 | −2.45744E+00 | 1.42390E−02 | −1.09520E−02 | 5.46790E−03 | −1.40100E−03 | 1.38110E−04 |
| R4 | −9.74434E+01 | 4.42950E−02 | −8.46400E−02 | 9.13010E−02 | −6.40610E−02 | 3.11590E−02 |
| R5 | −2.77369E+00 | 5.11390E−02 | −8.30740E−02 | 9.30430E−02 | −7.15740E−02 | 3.81500E−02 |
| R6 | −1.63076E+01 | 1.01080E−02 | −4.65510E−03 | 4.00060E−03 | −4.81900E−03 | 4.49340E−03 |
| R7 | −6.99700E+00 | 1.77130E−02 | −5.05410E−03 | −2.85930E−03 | 5.72550E−03 | −5.42220E−03 |
| R8 | −4.67140E+00 | −1.27260E−01 | 1.77610E−01 | −1.79480E−01 | 1.20590E−01 | −5.45550E−02 |
| R9 | 1.76961E−01 | −1.63110E−01 | 2.31270E−01 | −2.24270E−01 | 1.56120E−01 | −7.50720E−02 |
| R10 | −8.78410E+01 | −7.65660E−02 | 7.02240E−02 | −4.87140E−02 | 2.69960E−02 | −1.05770E−02 |
| R11 | −3.75929E+00 | −1.23940E−02 | 3.13400E−03 | −9.06630E−04 | 2.05770E−04 | −3.02970E−05 |
| R12 | 7.60413E+00 | −1.26510E−02 | 3.38550E−03 | −1.11790E−03 | 2.36030E−04 | −3.04070E−05 |

| | Conic coefficient | Aspheric coefficient | | | |
| --- | --- | --- | --- | --- | --- |
| | k | A14 | A16 | A18 | A20 |
| R3 | −2.45744E+00 | 3.35790E−05 | −1.48250E−05 | 2.24720E−06 | −1.28750E−07 |
| R4 | −9.74434E+01 | −1.02340E−02 | 2.16030E−03 | −2.65110E−04 | 1.44330E−05 |
| R5 | −2.77369E+00 | −1.36310E−02 | 3.10610E−03 | −4.08060E−04 | 2.35260E−05 |
| R6 | −1.63076E+01 | −2.61380E−03 | 9.26510E−04 | −1.84210E−04 | 1.56200E−05 |
| R7 | −6.99700E+00 | 2.51850E−03 | −5.73940E−04 | 3.61620E−05 | 4.71230E−06 |

|

TABLE 2-continued

| R8 | −4.67140E+00 | 1.61270E−02 | −2.93260E−03 | 2.90080E−04 | −1.13920E−05 |
| R9 | 1.76961E−01 | 2.42380E−02 | −4.98630E−03 | 5.88940E−04 | −3.03360E−05 |
| R10 | −8.78410E+01 | 2.81110E−03 | −4.80700E−04 | 4.76030E−05 | −2.07500E−06 |
| R11 | −3.75929E+00 | 2.82440E−06 | −1.61370E−07 | 5.15100E−09 | −7.03650E−11 |
| R12 | 7.60413E+00 | 2.43510E−06 | −1.18590E−07 | 3.20950E−09 | −3.69990E−11 |

For convenience, the aspheric surface of each lens surface uses the aspheric surface shown in the following equation (1). However, the present disclosure is not limited to the form of the aspheric surface polynomial shown in equation (1).

$$z = (cr^2)/\{1 + [1 - (k+1)(c^2 r^2)]^{1/2}\} + A4r^4 + A6r^6 + \quad (1)$$
$$A8r^8 + A10r^{10} + A12r^{12} + A14r^{14} + A16r^{16} + A18r^{18} + A20r^{20}$$

In equation (1) above, k is the conic coefficient, A4, A6, A8, A10, A12, A14, A16, A18, A20 are the aspheric coefficients, c is the curvature at the center of the optical surface, r is the vertical distance between the point on the curved line of the aspheric surface and an optical axis, and z is a depth of the aspheric surface (the vertical distance between the point on the aspheric surface, with a distance of r from the optical axis, and the tangent plane to the vertex on the aspheric surface).

Table 3 and Table 4 show design data of inflection points and arrest points of each lens of the camera optical lens 10 according to the first embodiment of the present disclosure. P1R1 and P1R2 represent the object-side surface and the image-side surface of the first lens L1, respectively. P2R1 and P2R2 represent the object-side surface and the image-side surface of the second lens L2, respectively. P3R1 and P3R2 represent the object-side surface and the image-side surface of the third lens L3, respectively. P4R1 and P4R2 represent the object-side surface and the image-side surface of the fourth lens L4, respectively. P5R1 and P5R2 represent the object-side surface and the image-side surface of the fifth lens L5, respectively. P6R1 and P6R2 represent the object-side surface and the image-side surface of the sixth lens L6, respectively. The data corresponding to the column "inflection point position" is the vertical distance from the inflection point provided on the surface of each lens to the optical axis of the camera optical lens 10. The data corresponding to the column "arrest point position" is a vertical distance from the arrest point provided on the surface of each lens to the optical axis of the camera optical lens 10.

TABLE 3

| | The number of inflection points | Inflection point position 1 | Inflection point position 2 | Inflection point position 3 |
|---|---|---|---|---|
| P1R1 | 0 | / | / | / |
| P1R2 | 0 | / | / | / |
| P2R1 | 2 | 1.585 | 2.195 | / |
| P2R2 | 1 | 0.985 | / | / |
| P3R1 | 0 | / | / | / |
| P3R2 | 1 | 1.175 | / | / |
| P4R1 | 2 | 1.195 | 1.675 | / |
| P4R2 | 1 | 1.865 | / | / |
| P5R1 | 2 | 1.455 | 1.985 | / |
| P5R2 | 2 | 0.175 | 1.135 | / |
| P6R1 | 3 | 1.625 | 2.165 | 3.375 |
| P6R2 | 1 | 0.715 | / | / |

TABLE 4

| | The number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 1 | 1.425 | / |
| P3R1 | 0 | / | / |
| P3R2 | 0 | / | / |
| P4R1 | 2 | 1.605 | 1.705 |
| P4R2 | 0 | / | / |
| P5R1 | 0 | / | / |
| P5R2 | 2 | 0.305 | 1.535 |
| P6R1 | 0 | / | / |
| P6R2 | 1 | 1.325 | / |

Figure 2:
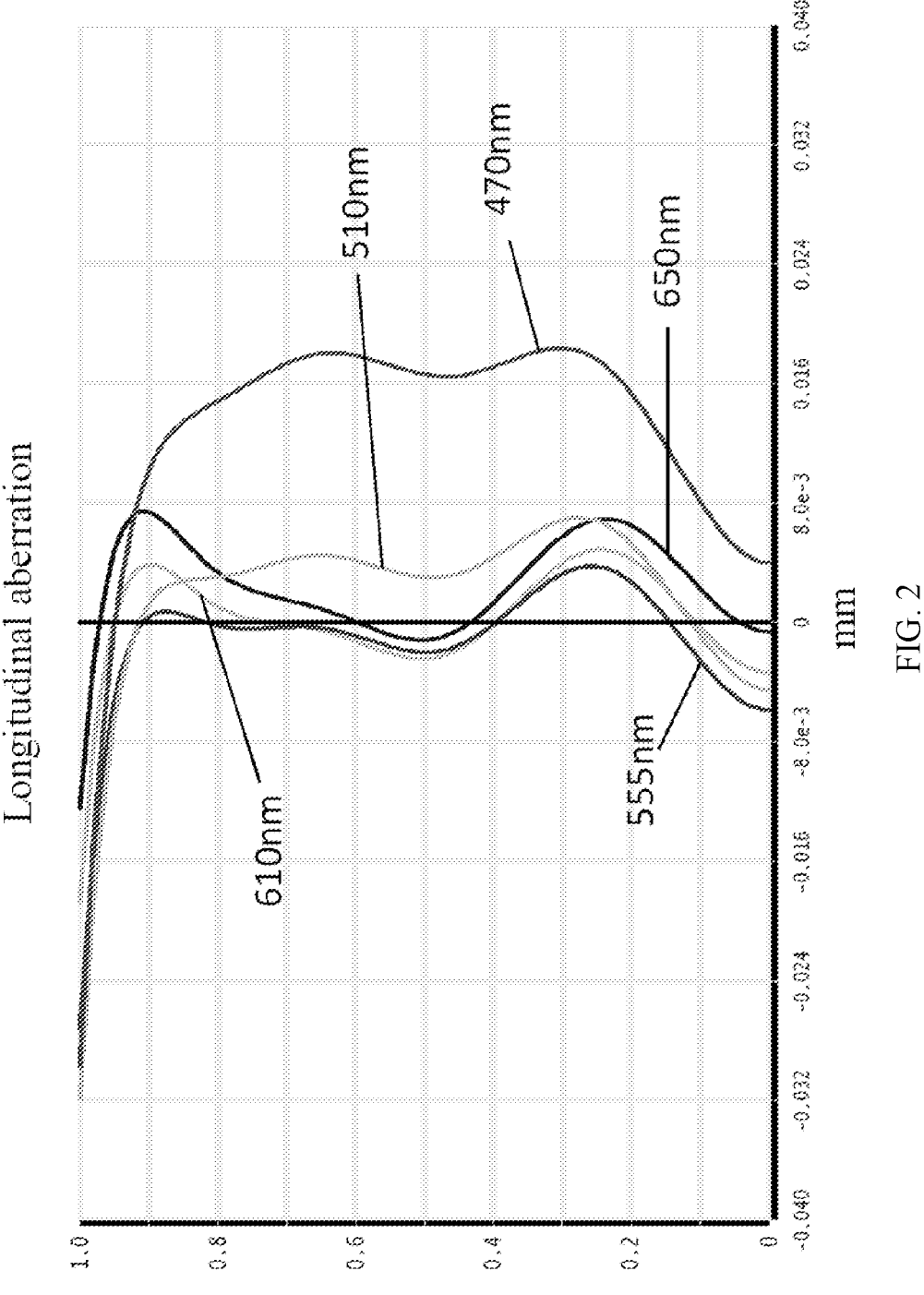
FIG. 2 is a schematic diagram of longitudinal aberration of the camera optical lens shown in FIG. 1.
Figure 3:
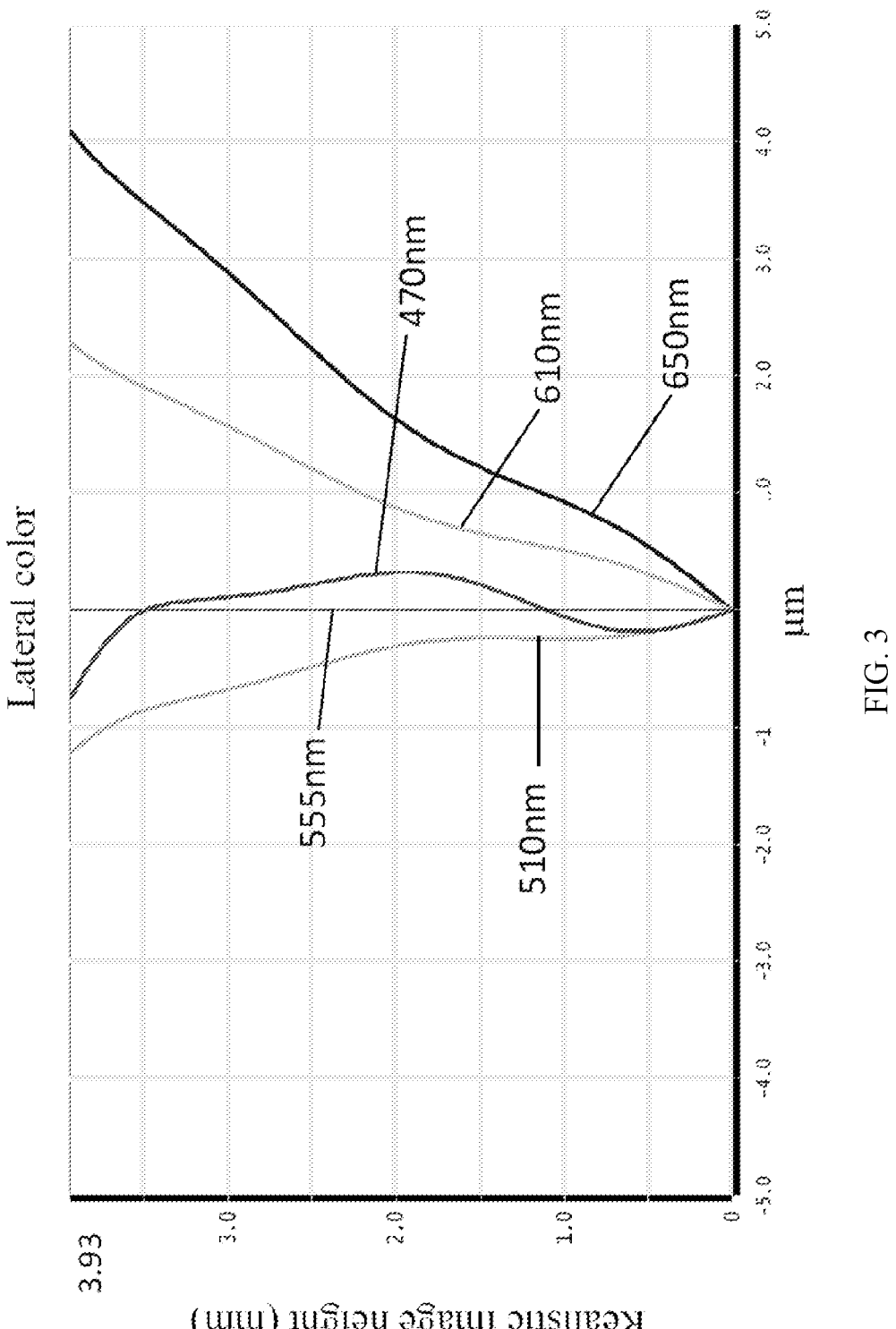
FIG. 3 is a schematic diagram of lateral color of the camera optical lens shown in FIG. 1.
Figure 4:
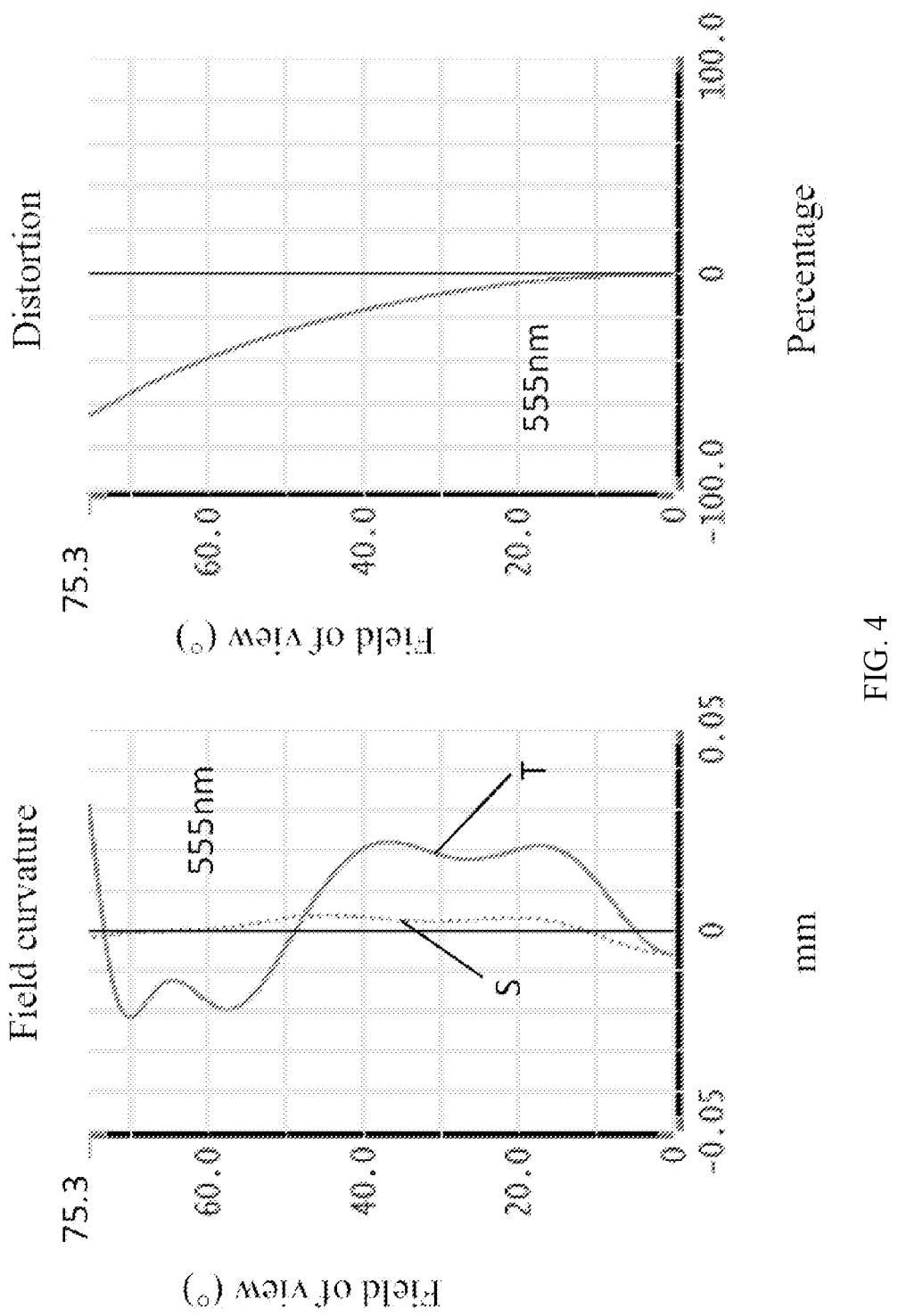
FIG. 4 is a schematic diagram of field curvature and distortion of the camera optical lens shown in FIG. 1.

FIG. 2 and FIG. 3 show schematic diagrams of a longitudinal aberration and a lateral color of light with wavelengths of 650 nm, 610 nm, 555 nm, 510 nm and 470 nm after passing through the camera optical lens 10 according to the first embodiment, respectively. FIG. 4 shows a field curvature and a distortion of light with a wavelength of 555 nm after passing through the camera optical lens 10 according to the first embodiment. The field curvature S in FIG. 4 is a field curvature in a sagittal direction, and the field curvature T is a field curvature in a meridian direction.

The following Table 29 shows the values, corresponding to the parameters specified in the conditional, for various values in each embodiment.

As shown in Table 29, the first embodiment satisfies each conditional.

In this embodiment, the entrance pupil diameter ENPD of the camera optical lens 10 is 1.237 mm, the full-field image height IH is 3.930 mm, and the field of view FOV in the diagonal direction is 150.62°. The camera optical lens 10 meets the design requirements of large aperture, ultra-wide-angle, and miniaturization, the on-axis and off-axis lateral color/aberration thereof are sufficiently corrected, and it has excellent optical characteristics.

Second Embodiment

The second embodiment is substantially the same as the first embodiment, and the meanings of reference signs are the same as those of the first embodiment. Only differences are listed below.

Figure 5:
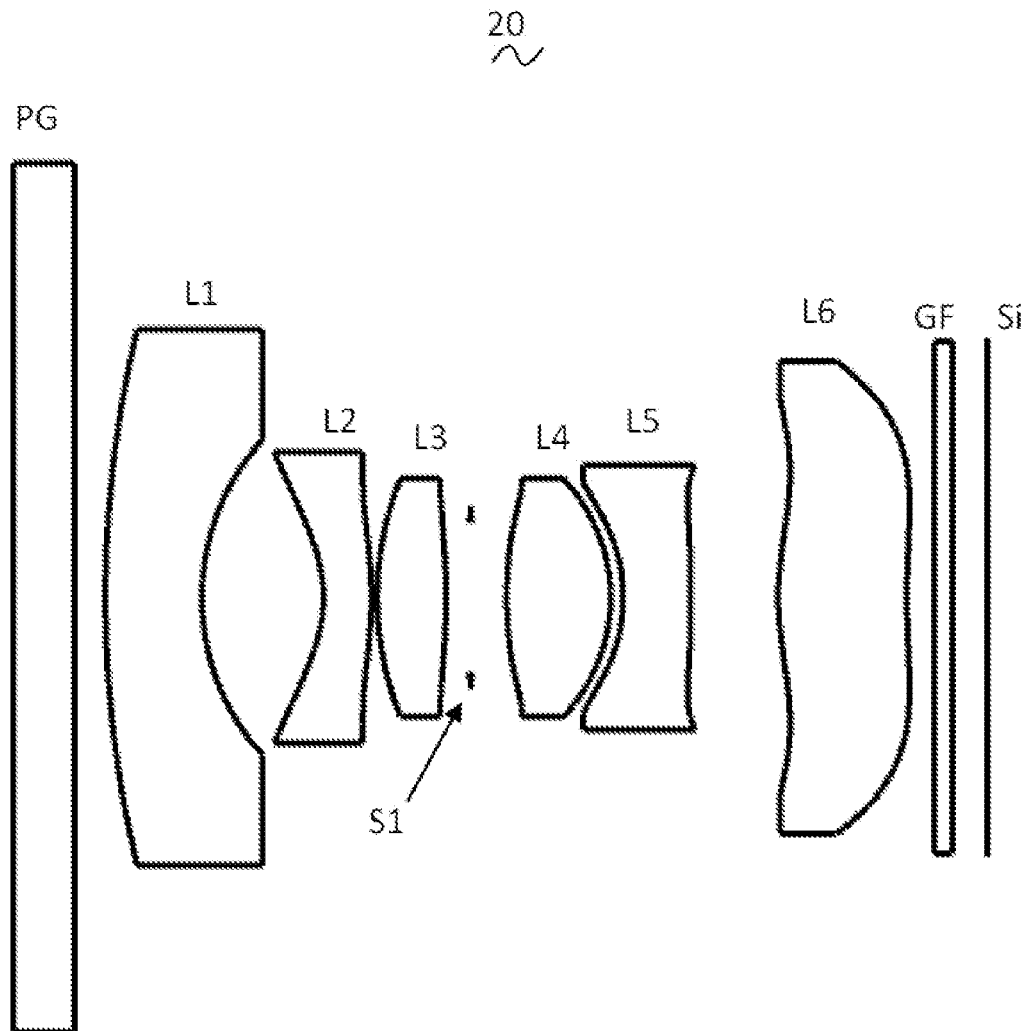
FIG. 5 is a structural schematic diagram of a camera optical lens according to a second embodiment of the present disclosure.

FIG. 5 shows a camera optical lens 20 according to the second embodiment of the present disclosure.

Table 5 and Table 6 show design data of the camera optical lens 20 according to the second embodiment of the present disclosure.

TABLE 5

| | R | | d | | nd | | vd |
|---|---|---|---|---|---|---|---|
| R0 | ∞ | T0= | 1.000 | ndg1 | 1.5168 | vg1 | 64.17 |
| R01 | ∞ | T01= | 0.500 | | | | |
| S1 | ∞ | d0= | −5.948 | | | | |
| R1 | 16.298 | d1= | 1.574 | nd1 | 1.6936 | v1 | 49.23 |

TABLE 5-continued

| | R | | d | | nd | | vd |
|---|---|---|---|---|---|---|---|
| R2 | 3.393 | d2= | 1.982 | | | | |
| R3 | −1.837 | d3= | 0.779 | nd2 | 1.5444 | v2 | 55.82 |
| R4 | −4.231 | d4= | 0.094 | | | | |
| R5 | 4.898 | d5= | 1.126 | nd3 | 1.8017 | v3 | 40.63 |
| R6 | −7.684 | d6= | 0.985 | | | | |
| R7 | 6.557 | d7= | 1.693 | nd4 | 1.5444 | v4 | 55.82 |
| R8 | −2.712 | d8= | 0.201 | | | | |
| R9 | −3.171 | d9= | 1.093 | nd5 | 1.6700 | v5 | 19.39 |
| R10 | 24.785 | d10= | 1.438 | | | | |
| R11 | 3.851 | d11= | 2.096 | nd6 | 1.5444 | v6 | 55.82 |
| R12 | 9.638 | d12= | 0.440 | | | | |
| R13 | ∞ | d13= | 0.300 | ndg2 | 1.5168 | vg2 | 64.17 |
| R14 | ∞ | d14= | 0.568 | | | | |

Table 6 shows aspheric surface data of each lens of the camera optical lens 20 according to the second embodiment of the present disclosure.

TABLE 6

| | Conic coefficient | Aspheric coefficient | | | | |
|---|---|---|---|---|---|---|
| | k | A4 | A6 | A8 | A10 | A12 |
| R3 | −2.93217E+00 | 1.41090E−02 | −1.17800E−02 | 6.14430E−03 | −1.64310E−03 | 1.58570E−04 |
| R4 | −3.61432E+01 | 4.45960E−02 | −8.41780E−02 | 9.08080E−02 | −6.41740E−02 | 3.13950E−02 |
| R5 | −2.93907E+00 | 4.74500E−02 | −8.25060E−02 | 9.28130E−02 | −7.15630E−02 | 3.81900E−02 |
| R6 | −1.66167E+01 | 1.16350E−02 | −5.14080E−02 | 4.66810E−03 | −5.45640E−03 | 5.07930E−03 |
| R7 | −5.02245E+00 | 1.98600E−02 | −1.15720E−03 | −5.83020E−03 | 6.82690E−03 | −5.31740E−03 |
| R8 | −4.39471E+00 | −1.26550E−01 | 1.77690E−01 | −1.78450E−01 | 1.20040E−01 | −5.43700E−02 |
| R9 | −8.67966E−02 | −1.64280E−01 | 2.30320E−01 | −2.22960E−01 | 1.55400E−01 | −7.51320E−02 |
| R10 | −2.54243E+01 | −7.68340E−02 | 7.05380E−02 | −4.87720E−02 | 2.70190E−02 | −1.05760E−02 |
| R11 | −8.66425E+00 | −1.73080E−02 | 3.12860E−03 | −9.33260E−04 | 2.13020E−04 | −3.07840E−05 |
| R12 | 5.71407E+00 | −1.90330E−02 | 3.33860E−03 | −1.12770E−03 | 2.36100E−04 | −3.04070E−05 |

| | Conic coefficient | Aspheric coefficient | | | |
|---|---|---|---|---|---|
| | k | A14 | A16 | A18 | A20 |
| R3 | −2.93217E+00 | 3.89960E−05 | −1.61510E−05 | 2.31150E−06 | −1.24330E−07 |
| R4 | −3.61432E+01 | −1.03200E−02 | 2.14840E−03 | −2.55390E−04 | 1.32460E−05 |
| R5 | −2.93907E+00 | −1.36450E−02 | 3.10020E−03 | −4.07460E−04 | 2.37990E−05 |
| R6 | −1.66167E+01 | −2.86170E−03 | 9.29940E−04 | −1.64910E−04 | 1.25040E−05 |
| R7 | −5.02245E+00 | 2.30400E−03 | −5.00630E−04 | 3.55240E−05 | 2.36400E−06 |
| R8 | −4.39471E+00 | 1.60410E−02 | −2.90880E−03 | 2.88790E−04 | −1.15250E−05 |
| R9 | −8.67966E−02 | 2.43080E−02 | −4.99750E−03 | 5.93030E−04 | −3.12210E−05 |
| R10 | −2.54243E+01 | 2.81640E−03 | −4.85100E−04 | 4.88160E−05 | −2.19330E−06 |
| R11 | −8.66425E+00 | 2.80960E−06 | −1.57880E−07 | 5.16230E−09 | −7.83400E−11 |
| R12 | 5.71407E+00 | 2.44120E−06 | −1.19090E−07 | 3.17840E−09 | −3.47820E−11 |

Table 7 and Table 8 show design data of inflection points and arrest points of each lens of the camera optical lens 20 according to the second embodiment of the present disclosure.

TABLE 7

| | The number of inflection points | Inflection point position 1 | Inflection point position 2 |
|---|---|---|---|
| P1R1 | 0 | / | / |
| P1R2 | 0 | / | / |
| P2R1 | 1 | 1.665 | / |
| P2R2 | 1 | 1.055 | / |
| P3R1 | 0 | / | / |
| P3R2 | 2 | 1.045 | 1.475 |
| P4R1 | 2 | 1.345 | 1.605 |
| P4R2 | 1 | 1.765 | / |
| P5R1 | 1 | 1.515 | / |
| P5R2 | 2 | 0.225 | 1.095 |
| P6R1 | 2 | 0.975 | 2.785 |
| P6R2 | 2 | 0.775 | 3.535 |

TABLE 8

| | The number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 1 | 1.885 | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 2 | 0.405 | 1.455 |
| P6R1 | 2 | 1.905 | 3.205 |
| P6R2 | 1 | 1.385 | / |

Figure 6:
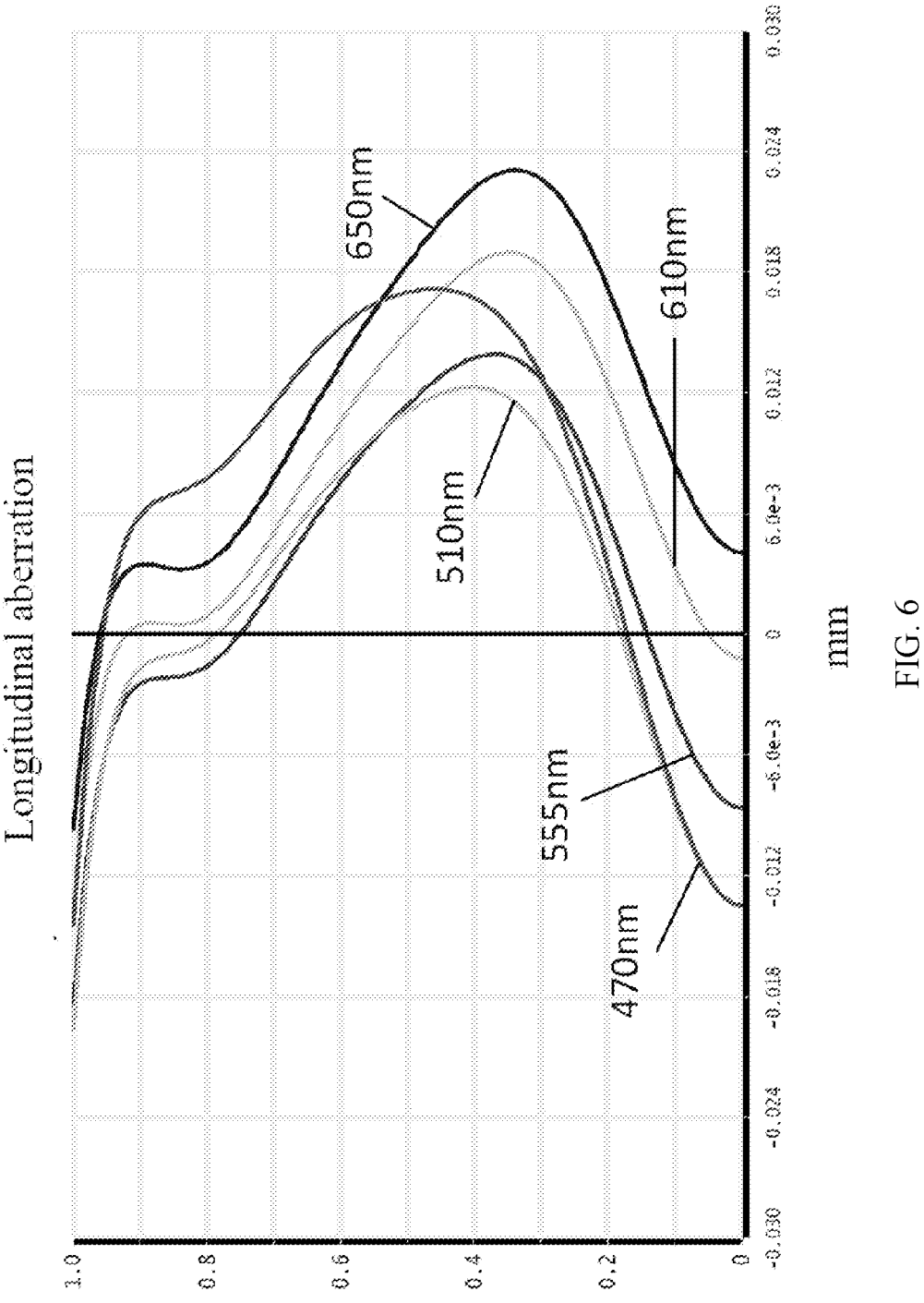
FIG. 6 is a schematic diagram of longitudinal aberration of the camera optical lens shown in FIG. 5.
Figure 7:
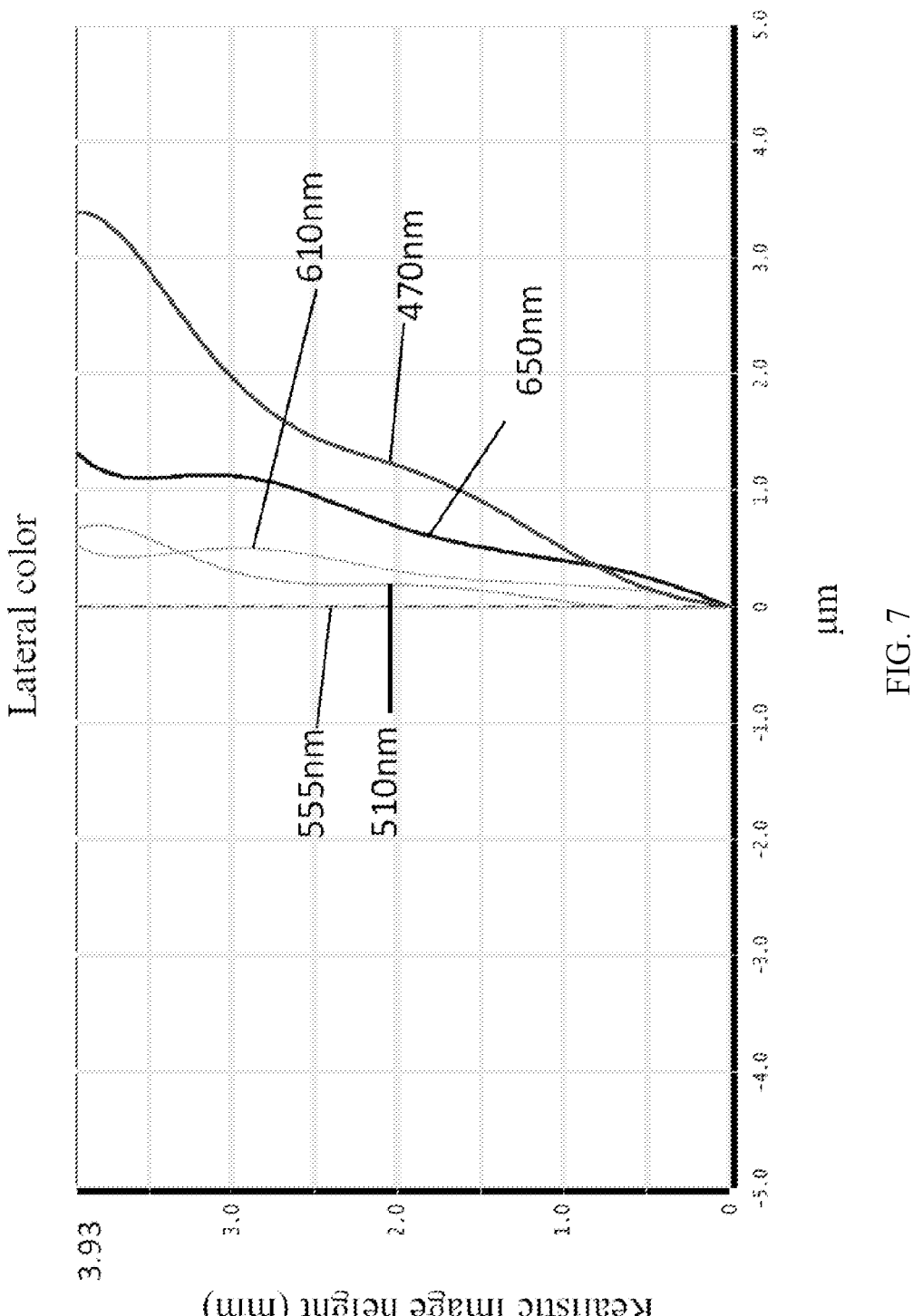
FIG. 7 is a schematic diagram of lateral color of the camera optical lens shown in FIG. 5.
Figure 8:
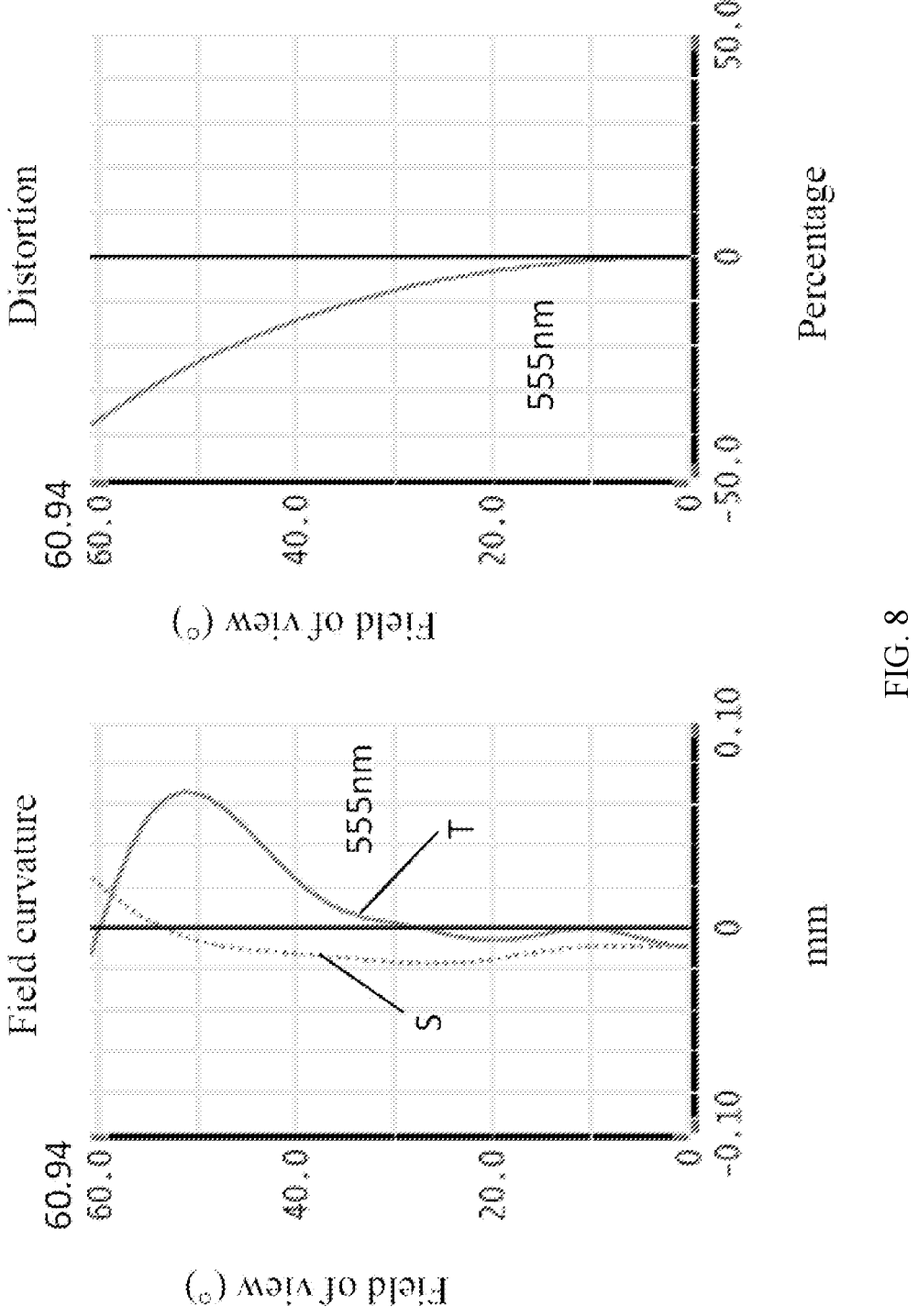
FIG. 8 is a schematic diagram of field curvature and distortion of the camera optical lens shown in FIG. 5.

FIG. 6 and FIG. 7 show schematic diagrams of a longitudinal aberration and a lateral color of light with wavelengths of 650 nm, 610 nm, 555 nm, 510 nm and 470 nm after passing through the camera optical lens 20 according to the second embodiment, respectively. FIG. 8 shows a field curvature and a distortion of light with a wavelength of 555 nm after passing through the camera optical lens 20 according to the second embodiment. The field curvature S in FIG. 8 is a field curvature in a sagittal direction, and the field curvature T is a field curvature in a meridian direction.

As shown in Table 29, the second embodiment satisfies each conditional.

In this embodiment, the entrance pupil diameter ENPD of the camera optical lens 20 is 1.464 mm, the full-field image height IH is 3.930 mm, and the field of view FOV in the diagonal direction is 121.88°. The camera optical lens 20 meets the design requirements of large aperture, ultra-wide-angle, and miniaturization, the on-axis and off-axis lateral color/aberration thereof are sufficiently corrected, and it has excellent optical characteristics.

Third Embodiment

The third embodiment is substantially the same as the first embodiment, and the meanings of reference signs are the same as those of the first embodiment. Only differences are listed below.

Figure 9:
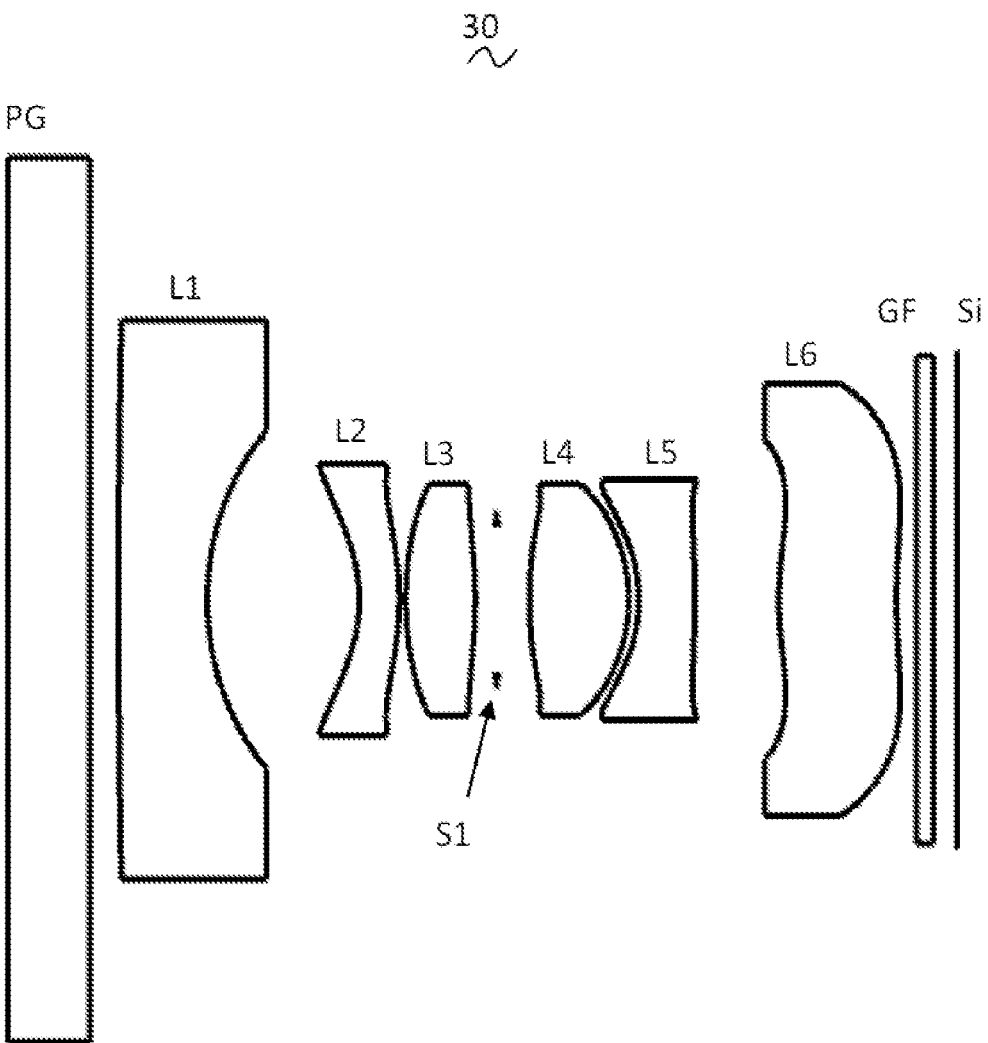
FIG. 9 is a structural schematic diagram of a camera optical lens according to a third embodiment of the present disclosure.

FIG. 9 shows a camera optical lens 30 according to the third embodiment of the present disclosure.

Table 9 and Table 10 show design data of the camera optical lens 30 according to the third embodiment of the present disclosure.

TABLE 9

|  | R |  | d |  | nd |  | vd |
|---|---|---|---|---|---|---|---|
| R0 | ∞ | T0= | 1.000 | ndg1 | 1.5168 | vg1 | 64.17 |
| R01 | ∞ | T01= | 0.500 |  |  |  |  |
| S1 | ∞ | d0= | −6.758 |  |  |  |  |
| R1 | 182.636 | d1= | 1.587 | nd1 | 1.6936 | v1 | 49.23 |
| R2 | 3.900 | d2= | 2.716 |  |  |  |  |
| R3 | −2.118 | d3= | 0.712 | nd2 | 1.5444 | v2 | 55.82 |
| R4 | −3.605 | d4= | 0.120 |  |  |  |  |
| R5 | 5.514 | d5= | 1.237 | nd3 | 1.8017 | v3 | 40.63 |
| R6 | −6.497 | d6= | 0.969 |  |  |  |  |
| R7 | 6.445 | d7= | 1.771 | nd4 | 1.5444 | v4 | 55.82 |
| R8 | −2.637 | d8= | 0.176 |  |  |  |  |
| R9 | −2.921 | d9= | 0.997 | nd5 | 1.6700 | v5 | 19.39 |
| R10 | 32.025 | d10= | 1.510 |  |  |  |  |
| R11 | 4.297 | d11= | 2.097 | nd6 | 1.5444 | v6 | 55.82 |
| R12 | 7.737 | d12= | 0.373 |  |  |  |  |
| R13 | ∞ | d13= | 0.300 | ndg2 | 1.5168 | vg2 | 64.17 |
| R14 | ∞ | d14= | 0.416 |  |  |  |  |

Table 10 shows aspheric surface data of each lens of the camera optical lens 30 according to the third embodiment of the present disclosure.

Table 11 and Table 12 show design data of inflection points and arrest points of each lens of the camera optical lens 30 according to the third embodiment of the present disclosure.

TABLE 11

|  | The number of inflection points | Inflection point position 1 | Inflection point position 2 |
|---|---|---|---|
| P1R1 | 0 | / | / |
| P1R2 | 0 | / | / |
| P2R1 | 1 | 1.525 | / |
| P2R2 | 1 | 1.215 | / |
| P3R1 | 0 | / | / |
| P3R2 | 2 | 1.045 | 1.565 |
| P4R1 | 1 | 1.225 | / |
| P4R2 | 0 | / | / |
| P5R1 | 1 | 1.535 | / |
| P5R2 | 2 | 0.195 | 1.035 |
| P6R1 | 1 | 0.825 | / |
| P6R2 | 1 | 0.845 | / |

TABLE 12

|  | The number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 1 | 1.855 | / |
| P3R1 | 0 | / | / |
| P3R2 | 0 | / | / |
| P4R1 | 1 | 1.545 | / |
| P4R2 | 0 | / | / |

TABLE 10

| | Conic coefficient | Aspheric coefficient | | | | |
|---|---|---|---|---|---|---|
| | k | A4 | A6 | A8 | A10 | A12 |
| R3 | −2.42209E+00 | 1.17430E−02 | −1.10010E−02 | 5.72270E−03 | −1.36990E−03 | 1.18320E−04 |
| R4 | −1.72352E+01 | 3.79380E−02 | −8.37180E−02 | 9.09610E−02 | −6.39300E−02 | 3.11260E−02 |
| R5 | −1.54430E+00 | 5.14600E−02 | −8.34070E−02 | 9.29970E−02 | −7.15010E−02 | 3.81410E−02 |
| R6 | −1.67169E+01 | 1.12200E−02 | −4.50600E−03 | 4.23660E−03 | −4.91890E−03 | 4.51220E−03 |
| R7 | −2.41880E+00 | 1.87350E−02 | −3.54990E−03 | −4.31820E−03 | 5.92220E−03 | −5.31410E−03 |
| R8 | −4.75818E+00 | −1.28370E−01 | 1.75710E−01 | −1.77340E−01 | 1.19800E−01 | −5.44920E−02 |
| R9 | 3.50250E−02 | −1.60270E−01 | 2.33410E−01 | −2.24150E−01 | 1.55750E−01 | −7.50860E−02 |
| R10 | −7.64767E+01 | −7.56020E−02 | 7.20080E−02 | −4.92370E−02 | 2.71450E−02 | −1.05810E−02 |
| R11 | −1.11419E+01 | −2.05620E−02 | 2.52060E−03 | −8.85430E−04 | 2.07230E−04 | −3.04580E−05 |
| R12 | −1.28025E+01 | −1.59280E−02 | 3.10270E−03 | −1.11270E−03 | 2.36090E−04 | −3.03710E−05 |

| | Conic coefficient | Aspheric coefficient | | | |
|---|---|---|---|---|---|
| | k | A14 | A16 | A18 | A20 |
| R3 | −2.42209E+00 | 3.43020E−05 | −1.49310E−05 | 2.32530E−06 | −1.34150E−07 |
| R4 | −1.72352E+01 | −1.02380E−02 | 2.16250E−03 | −2.64610E−04 | 1.42350E−05 |
| R5 | −1.54430E+00 | −1.36300E−02 | 3.10480E−03 | −4.08040E−04 | 2.35550E−05 |
| R6 | −1.67169E+01 | −2.61910E−03 | 9.31690E−04 | −1.84190E−04 | 1.50450E−05 |
| R7 | −2.41880E+00 | 2.55290E−03 | −5.98680E−04 | 3.93350E−05 | 2.93930E−06 |
| R8 | −4.75818E+00 | 1.61350E−02 | −2.93330E−03 | 2.89830E−04 | −1.14040E−05 |
| R9 | 3.50250E−02 | 2.42150E−02 | −4.97660E−03 | 5.90610E−04 | −3.06660E−05 |
| R10 | −7.64767E+01 | 2.80320E−03 | −4.80940E−04 | 4.78820E−05 | −2.06140E−06 |
| R11 | −1.11419E+01 | 2.72380E−06 | −1.67660E−07 | 4.64540E−09 | −1.08700E−10 |
| R12 | −1.28025E+01 | 2.43210E−06 | −1.18840E−07 | 3.20250E−09 | −3.64250E−11 |

TABLE 12-continued

| | The number of arrest points | Arrest point position 1 | Arrest point position 2 |
|---|---|---|---|
| P5R1 | 0 | / | / |
| P5R2 | 2 | 0.345 | 1.385 |
| P6R1 | 1 | 1.515 | / |
| P6R2 | 1 | 1.505 | / |

Figure 10:
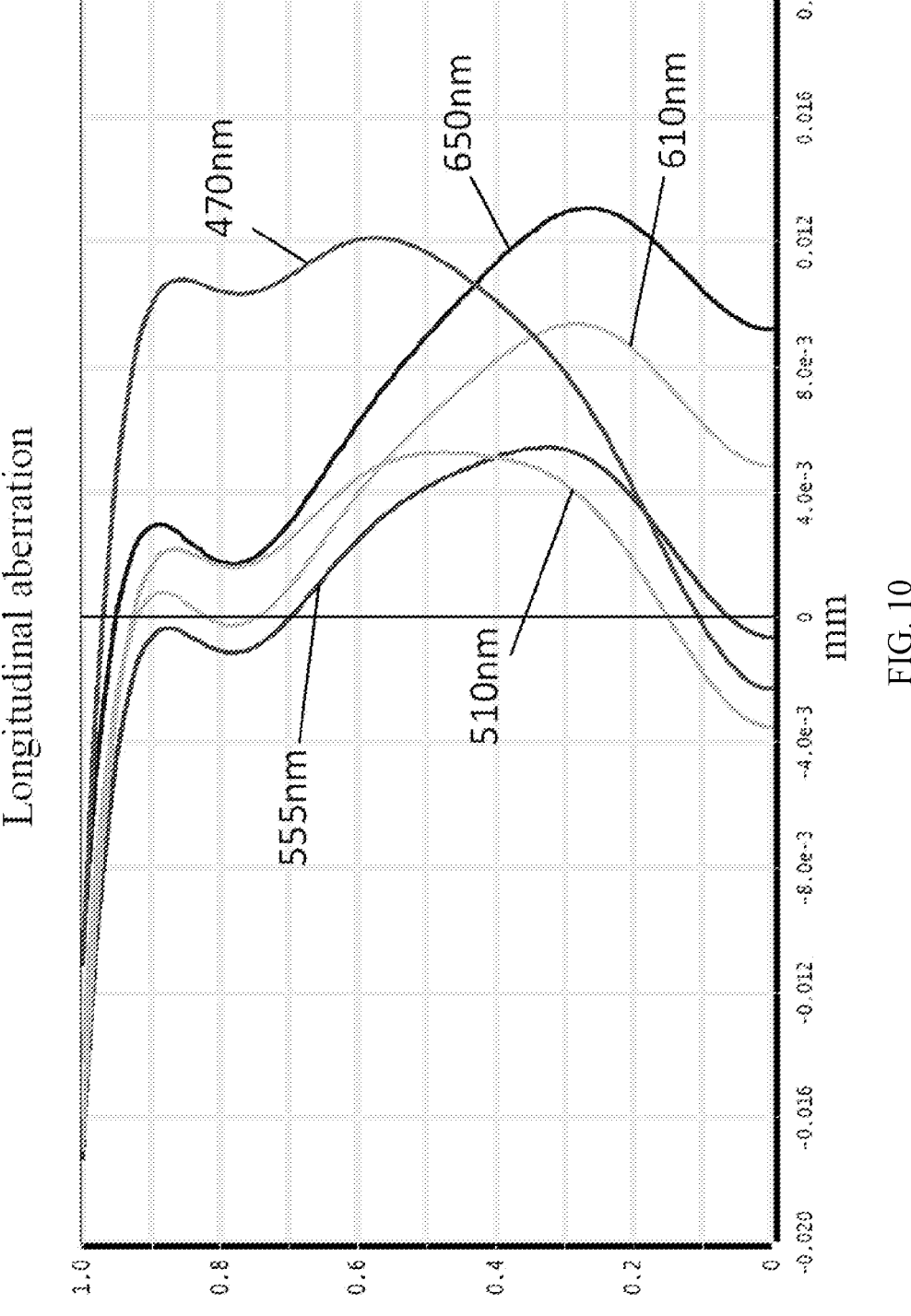
FIG. 10 is a schematic diagram of longitudinal aberration of the camera optical lens shown in FIG. 9.
Figure 11:
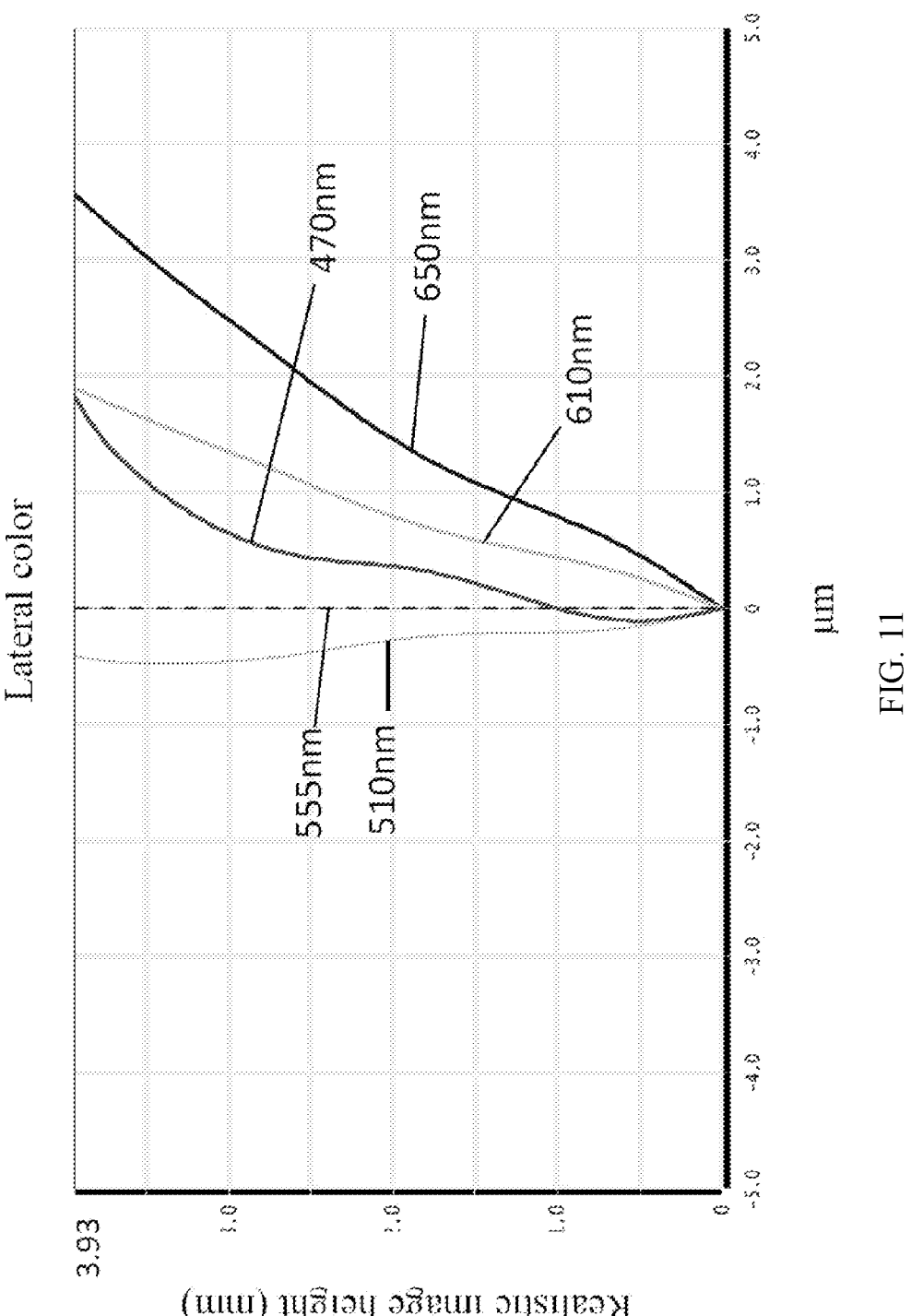
FIG. 11 is a schematic diagram of lateral color of the camera optical lens shown in FIG. 9.
Figure 12:
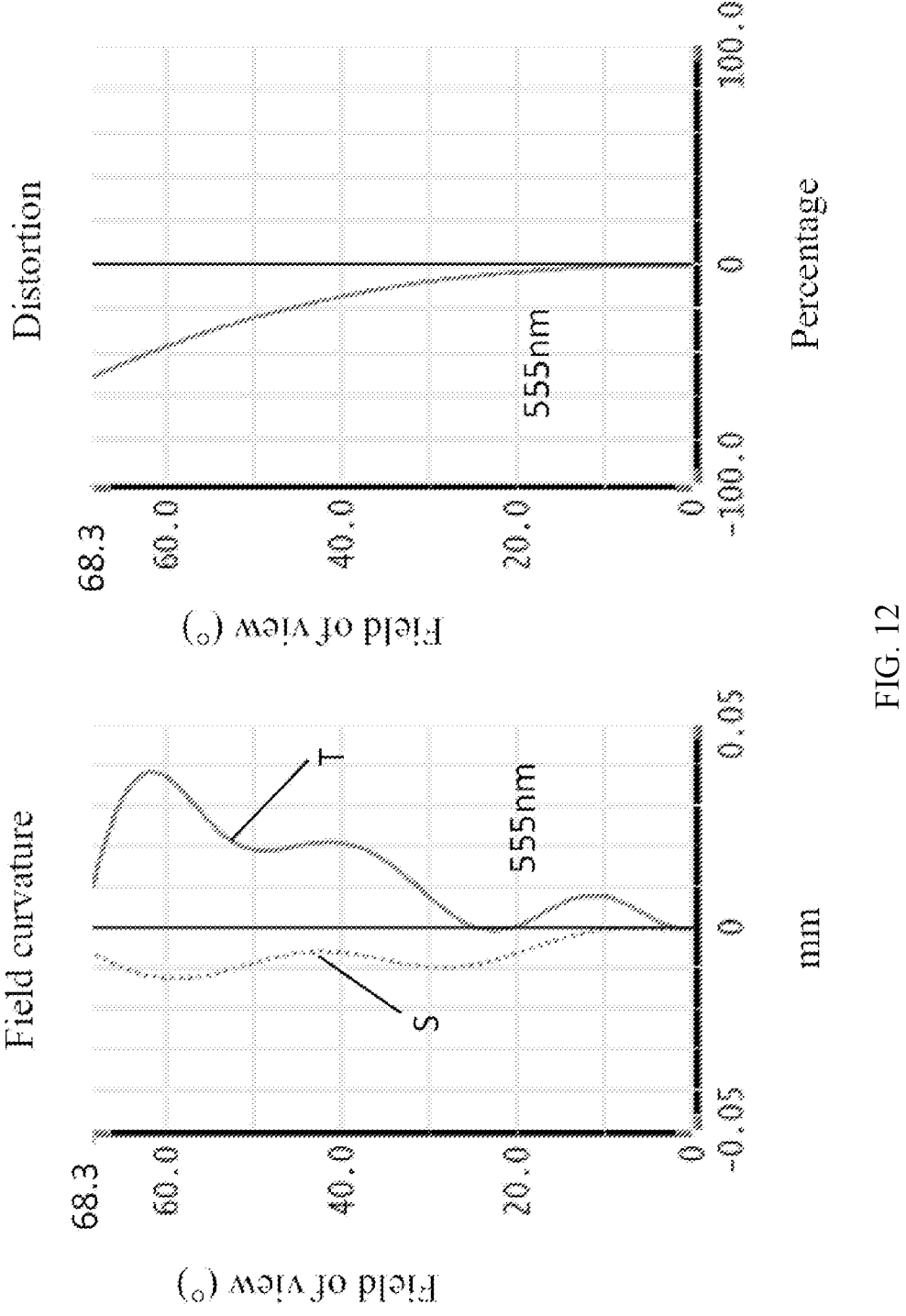
FIG. 12 is a schematic diagram of field curvature and distortion of the camera optical lens shown in FIG. 9.

FIG. 10 and FIG. 11 show schematic diagrams of a longitudinal aberration and a lateral color of light with wavelengths of 650 nm, 610 nm, 555 nm, 510 nm and 470 nm after passing through the camera optical lens 30 according to the third embodiment, respectively. FIG. 12 shows a field curvature and a distortion of light with a wavelength of 555 nm after passing through the camera optical lens 30 according to the third embodiment. The field curvature S in FIG. 12 is a field curvature in a sagittal direction, and the field curvature T is a field curvature in a meridian direction.

As shown in Table 29, the third embodiment satisfies each conditional.

In this embodiment, the entrance pupil diameter ENPD of the camera optical lens 30 is 1.335 mm, the full-field image height IH is 3.930 mm, and the field of view FOV in the diagonal direction is 136.60°. The camera optical lens 30

Table 13 and Table 14 show design data of the camera optical lens 40 according to the fourth embodiment of the present disclosure.

TABLE 13

| | R | | d | | nd | | vd |
|---|---|---|---|---|---|---|---|
| R0 | ∞ | T0= | 1.000 | ndg1 | 1.5168 | vg1 | 64.17 |
| R01 | ∞ | T01= | 0.500 | | | | |
| S1 | ∞ | d0= | −5.145 | | | | |
| R1 | 54.090 | d1= | 0.865 | nd1 | 1.6936 | v1 | 49.23 |
| R2 | 2.768 | d2= | 2.106 | | | | |
| R3 | −2.006 | d3= | 0.637 | nd2 | 1.5444 | v2 | 55.82 |
| R4 | −5.676 | d4= | 0.090 | | | | |
| R5 | 5.497 | d5= | 0.861 | nd3 | 2.0655 | v3 | 50.93 |
| R6 | −7.248 | d6= | 1.370 | | | | |
| R7 | 6.460 | d7= | 1.699 | nd4 | 1.5444 | v4 | 55.82 |
| R8 | −2.383 | d8= | 0.140 | | | | |
| R9 | −3.114 | d9= | 0.839 | nd5 | 1.6700 | v5 | 19.39 |
| R10 | 23.890 | d10= | 1.699 | | | | |
| R11 | 4.160 | d11= | 1.677 | nd6 | 1.5444 | v6 | 55.82 |
| R12 | 17.223 | d12= | 0.215 | | | | |
| R13 | ∞ | d13= | 0.300 | ndg2 | 1.5168 | vg2 | 64.17 |
| R14 | ∞ | d14= | 0.108 | | | | |

Table 14 shows aspheric surface data of each lens of the camera optical lens 40 according to the fourth embodiment of the present disclosure.

TABLE 14

| | Conic coefficient | Aspheric coefficient | | | | |
|---|---|---|---|---|---|---|
| | k | A4 | A6 | A8 | A10 | A12 |
| R3 | −2.33652E+00 | 1.27370E−02 | −1.10420E−02 | 5.52870E−03 | −1.37900E−03 | 1.34350E−04 |
| R4 | −1.02794E+02 | 4.42260E−02 | −8.57650E−02 | 9.11500E−02 | −6.39910E−02 | 3.11530E−02 |
| R5 | −3.90441E+00 | 5.28560E−02 | −8.29260E−02 | 9.30470E−02 | −7.15730E−02 | 3.81580E−02 |
| R6 | −1.52260E+01 | 1.23090E−02 | −5.03660E−03 | 4.68890E−03 | −4.80560E−03 | 4.49690E−03 |
| R7 | −1.04482E+01 | 1.96010E−02 | −3.25210E−03 | −3.09700E−03 | 5.59070E−03 | −5.45540E−03 |
| R8 | −4.35385E+00 | −1.26060E−01 | 1.77820E−01 | −1.79520E−01 | 1.20570E−01 | −5.45520E−02 |
| R9 | 4.06046E−01 | −1.64910E−01 | 2.30910E−01 | −2.24400E−01 | 1.56100E−01 | −7.50720E−02 |
| R10 | 9.20392E+01 | −7.51690E−02 | 7.05410E−02 | −4.86490E−02 | 2.69880E−02 | −1.05790E−02 |
| R11 | −6.00462E+00 | −1.40010E−02 | 2.97920E−03 | −9.10530E−04 | 2.05770E−04 | −3.02950E−05 |
| R12 | −6.93324E+01 | −1.50940E−02 | 3.34390E−03 | −1.12090E−03 | 2.35620E−04 | −3.04080E−05 |

| | Conic coefficient | Aspheric coefficient | | | |
|---|---|---|---|---|---|
| | k | A14 | A16 | A18 | A20 |
| R3 | −2.33652E+00 | 3.20580E−05 | −1.50160E−05 | 2.29680E−06 | −1.31910E−07 |
| R4 | −1.02794E+02 | −1.02350E−02 | 2.15950E−03 | −2.65430E−04 | 1.44490E−05 |
| R5 | −3.90441E+00 | −1.36220E−02 | 3.10740E−03 | −4.08190E−04 | 2.34520E−05 |
| R6 | −1.52260E+01 | −2.60650E−03 | 9.28600E−04 | −1.84640E−04 | 1.59920E−05 |
| R7 | −1.04482E+01 | 2.56070E−03 | −5.54730E−04 | 3.49390E−05 | −2.81610E−07 |
| R8 | −4.35385E+00 | 1.61270E−02 | −2.93220E−03 | 2.89310E−04 | −1.15360E−05 |
| R9 | 4.06046E−01 | 2.42370E−02 | −4.98490E−03 | 5.89070E−04 | −3.05590E−05 |
| R10 | 9.20392E+01 | 2.81060E−03 | −4.80640E−04 | 4.75960E−05 | −2.07800E−06 |
| R11 | −6.00462E+00 | 2.82360E−06 | −1.61480E−07 | 5.16720E−09 | −7.00210E−11 |
| R12 | −6.93324E+01 | 2.43430E−06 | −1.18570E−07 | 3.20370E−09 | −3.69010E−11 | meets the design requirements of large aperture, ultra-wide-angle, and miniaturization, the on-axis and off-axis lateral color/aberration thereof are sufficiently corrected, and it has excellent optical characteristics.

Fourth Embodiment

The fourth embodiment is substantially the same as the first embodiment, and the meanings of reference signs are the same as those of the first embodiment. Only differences are listed below.

Figure 13:
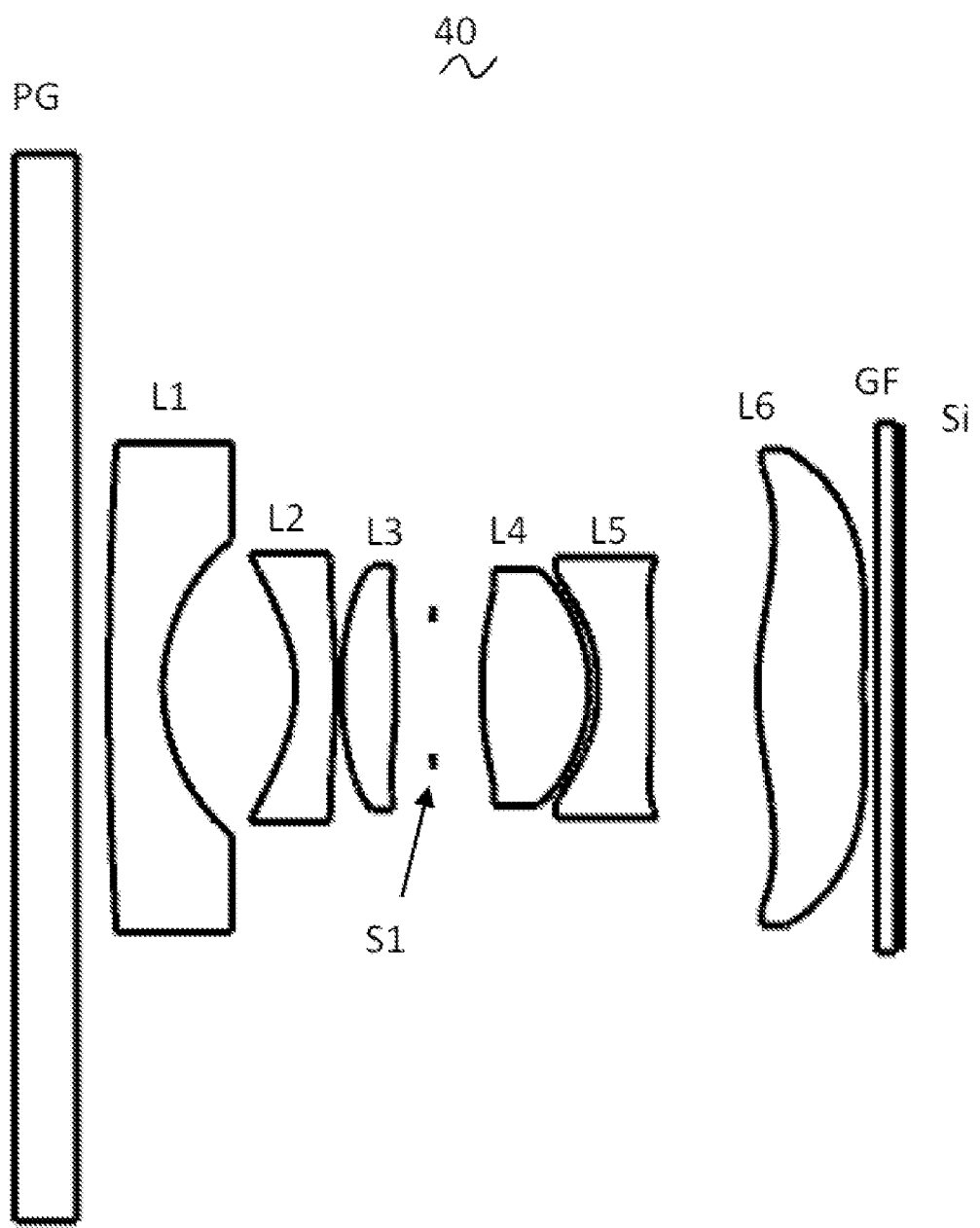
FIG. 13 is a structural schematic diagram of a camera optical lens according to a fourth embodiment of the present disclosure.

FIG. 13 shows a camera optical lens 40 according to the fourth embodiment of the present disclosure.

Table 15 and Table 16 show design data of inflection points and arrest points of each lens of the camera optical lens 40 according to the fourth embodiment of the present disclosure.

TABLE 15

| | The number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 2 | 1.105 | 1.685 |

TABLE 15-continued

| | The number of inflection points | Inflection point position 1 | Inflection point position 2 |
|---|---|---|---|
| P3R1 | 0 | / | / |
| P3R2 | 1 | 0.945 | / |
| P4R1 | 1 | 1.245 | / |
| P4R2 | 0 | / | / |
| P5R1 | 0 | / | / |
| P5R2 | 2 | 0.235 | 1.025 |
| P6R1 | 1 | 1.175 | / |
| P6R2 | 1 | 0.585 | / |

TABLE 16

| | The number of arrest points | Arrest point position 1 | Arrest point position 2 |
|---|---|---|---|
| P3R1 | 0 | / | / |
| P3R2 | 1 | 1.405 | / |
| P4R1 | 1 | 1.525 | / |
| P4R2 | 0 | / | / |
| P5R1 | 0 | / | / |
| P5R2 | 2 | 0.425 | 1.345 |
| P6R1 | 1 | 2.315 | / |
| P6R2 | 1 | 1.055 | / |

Figure 14:
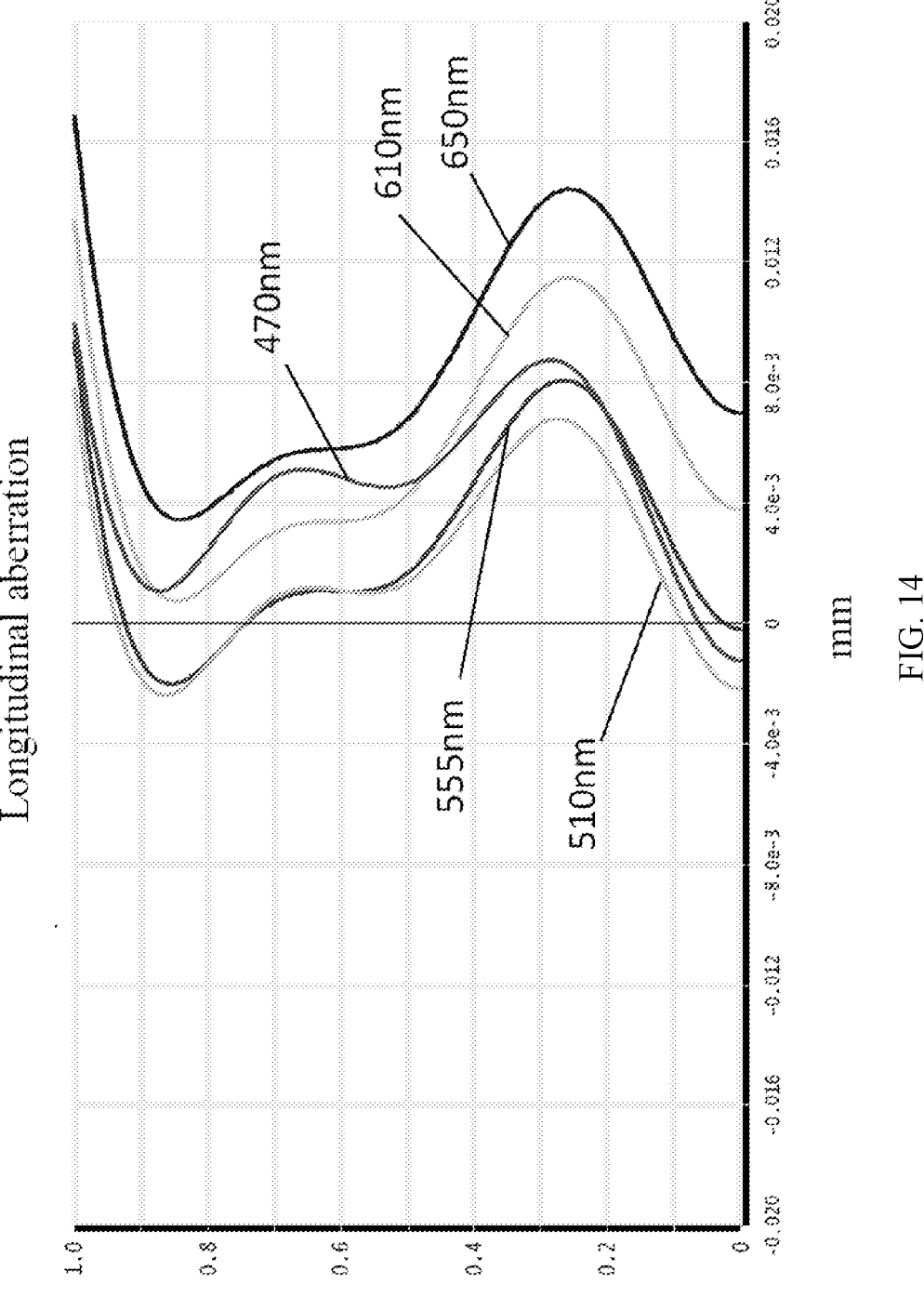
FIG. 14 is a schematic diagram of longitudinal aberration of the camera optical lens shown in FIG. 13.
Figure 15:
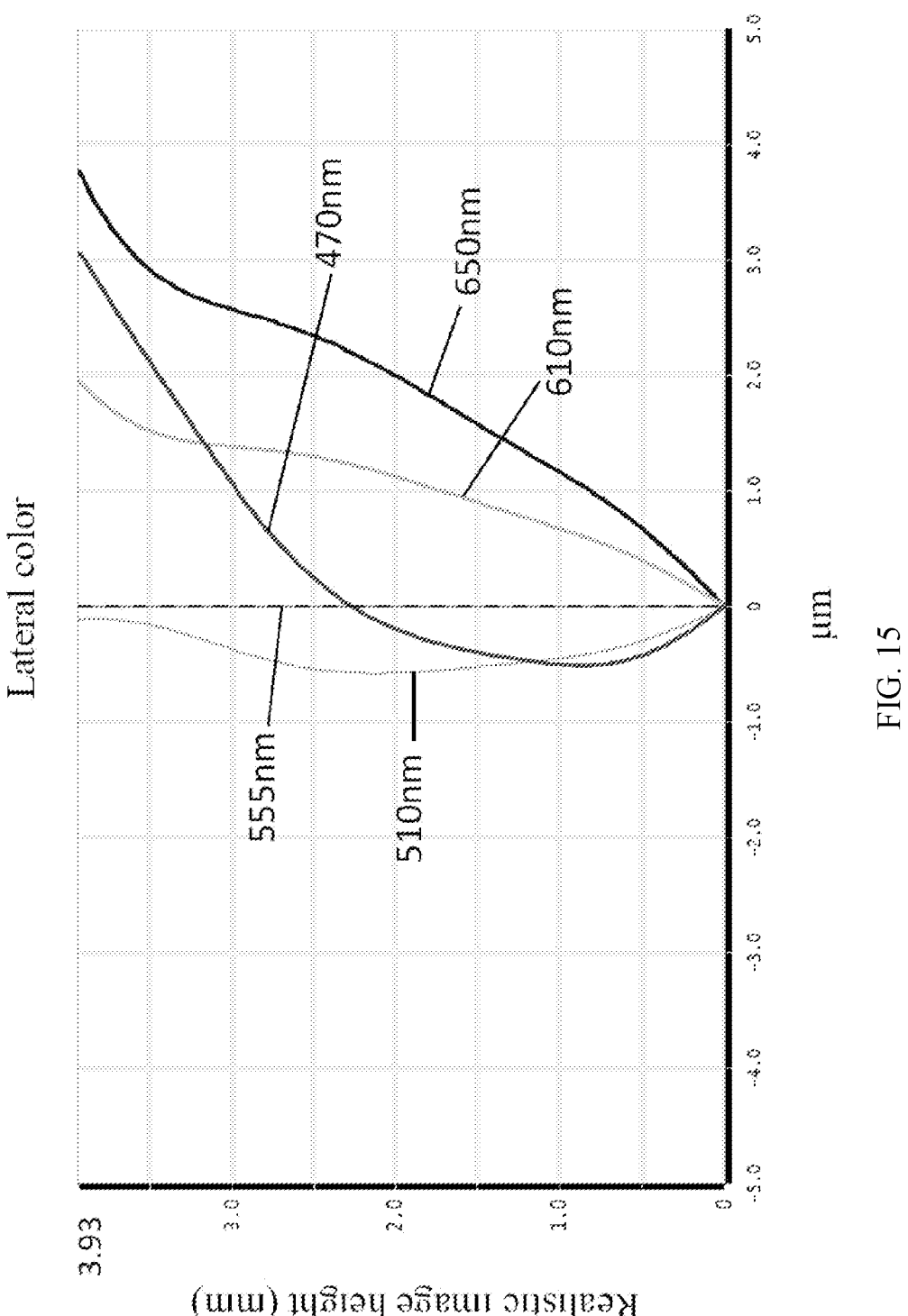
FIG. 15 is a schematic diagram of lateral color of the camera optical lens shown in FIG. 13.
Figure 16:
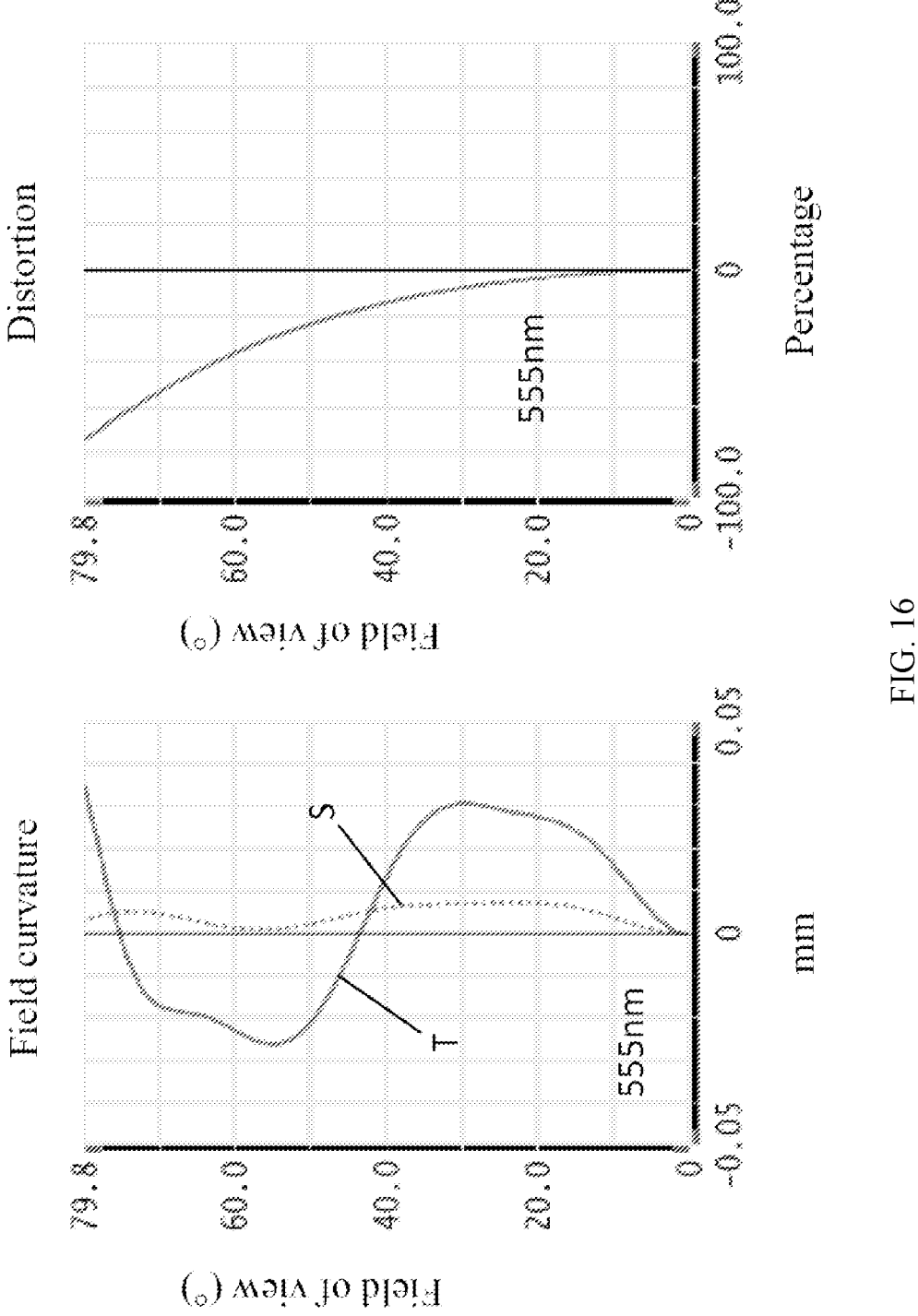
FIG. 16 is a schematic diagram of field curvature and distortion of the camera optical lens shown in FIG. 13.

FIG. 14 and FIG. 15 show schematic diagrams of a longitudinal aberration and a lateral color of light with wavelengths of 650 nm, 610 nm, 555 nm, 510 nm and 470 nm after passing through the camera optical lens 40 according to the fourth embodiment, respectively. FIG. 16 shows a field curvature and a distortion of light with a wavelength of 555 nm after passing through the camera optical lens 40 according to the fourth embodiment. The field curvature S in FIG. 16 is a field curvature in a sagittal direction, and the field curvature T is a field curvature in a meridian direction.

As shown in Table 29, the fourth embodiment satisfies each conditional.

In this embodiment, the entrance pupil diameter ENPD of the camera optical lens 40 is 1.146 mm, the full-field image height IH is 3.930 mm, and the field of view FOV in the diagonal direction is 159.64°. The camera optical lens 40 meets the design requirements of large aperture, ultra-wide-angle, and miniaturization, the on-axis and off-axis lateral color/aberration thereof are sufficiently corrected, and it has excellent optical characteristics.

Fifth Embodiment

The fifth embodiment is substantially the same as the first embodiment, and the meanings of reference signs are the same as those of the first embodiment. Only differences are listed below.

Figure 17:
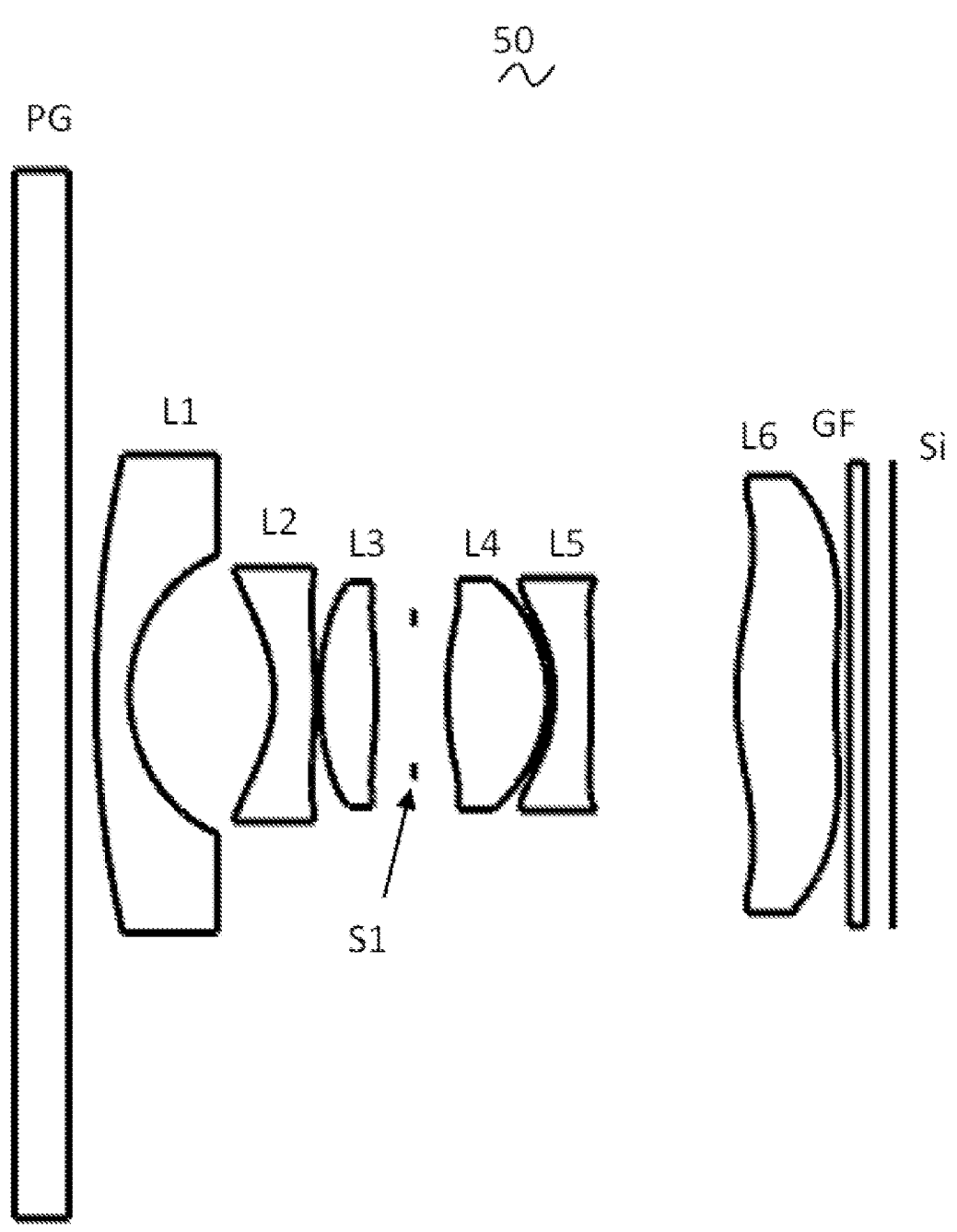
FIG. 17 is a structural schematic diagram of a camera optical lens according to a fifth embodiment of the present disclosure.

FIG. 17 shows a camera optical lens 50 according to the fifth embodiment of the present disclosure.

Table 17 and Table 18 show design data of the camera optical lens 50 according to the fifth embodiment of the present disclosure.

TABLE 17

| | R | | d | | nd | | vd |
|---|---|---|---|---|---|---|---|
| R0 | ∞ | T0= | 1.000 | ndg1 | 1.5168 | vg1 | 64.17 |
| R01 | ∞ | T01= | 0.500 | | | | |
| S1 | ∞ | d0= | -5.866 | | | | |
| R1 | 16.724 | d1= | 0.625 | nd1 | 1.6936 | v1 | 49.23 |
| R2 | 2.554 | d2= | 2.663 | | | | |
| R3 | -2.078 | d3= | 0.755 | nd2 | 1.5444 | v2 | 55.82 |
| R4 | -6.349 | d4= | 0.091 | | | | |
| R5 | 5.386 | d5= | 1.034 | nd3 | 1.8017 | v3 | 40.63 |
| R6 | -6.838 | d6= | 1.318 | | | | |
| R7 | 5.975 | d7= | 1.848 | nd4 | 1.5444 | v4 | 55.82 |
| R8 | -2.289 | d8= | 0.124 | | | | |
| R9 | -3.294 | d9= | 0.680 | nd5 | 1.6700 | v5 | 19.39 |
| R10 | 30.994 | d10= | 2.684 | | | | |
| R11 | 4.519 | d11= | 1.831 | nd6 | 1.5444 | v6 | 55.82 |
| R12 | 10.545 | d12= | 0.245 | | | | |
| R13 | ∞ | d13= | 0.300 | ndg2 | 1.5168 | vg2 | 64.17 |
| R14 | ∞ | d14= | 0.508 | | | | |

Table 18 shows aspheric surface data of each lens of the camera optical lens 50 according to the fifth embodiment of the present disclosure.

TABLE 18

| | Conic coefficient | Aspheric coefficient | | | | |
|---|---|---|---|---|---|---|
| | k | A4 | A6 | A8 | A10 | A12 |
| R3 | -2.38908E+00 | 1.30770E-02 | -1.09870E-02 | 5.56950E-03 | -1.40120E-03 | 1.34410E-04 |
| R4 | -8.48371E+01 | 4.36440E-02 | -8.48770E-02 | 9.12010E-02 | -6.40390E-02 | 3.11570E-02 |
| R5 | -2.55287E+00 | 5.26370E-02 | -8.25530E-02 | 9.30930E-02 | -7.16020E-02 | 3.81410E-02 |
| R6 | -1.84881E+01 | 1.24140E-02 | -3.65940E-03 | 4.07750E-03 | -4.81290E-03 | 4.47180E-03 |
| R7 | -5.12851E+00 | 1.86760E-02 | -4.29920E-03 | -3.10990E-03 | 5.74620E-03 | -5.40590E-03 |
| R8 | -4.51267E+00 | -1.24560E-01 | 1.77860E-01 | -1.79470E-01 | 1.20560E-01 | -5.45640E-02 |
| R9 | 1.50779E-01 | -1.62370E-01 | 2.31170E-01 | -2.24320E-01 | 1.56120E-01 | -7.50690E-02 |
| R10 | 8.98769E+01 | -7.54710E-02 | 7.05900E-02 | -4.86710E-02 | 2.69940E-02 | -1.05770E-02 |
| R11 | -1.31032E+00 | -1.49590E-02 | 2.86840E-03 | -9.05560E-04 | 2.05850E-04 | -3.02950E-05 |
| R12 | 5.53473E+00 | -1.68160E-02 | 3.45220E-03 | -1.11710E-03 | 2.34980E-04 | -3.03890E-05 |

| | Conic coefficient | Aspheric coefficient | | | |
|---|---|---|---|---|---|
| | k | A14 | A16 | A18 | A20 |
| R3 | -2.38908E+00 | 3.32150E-05 | -1.47430E-05 | 2.22590E-06 | -1.23820E-07 |
| R4 | -8.48371E+01 | -1.02330E-02 | 2.16010E-03 | -2.65120E-04 | 1.43930E-05 |
| R5 | -2.55287E+00 | -1.36270E-02 | 3.10630E-03 | -4.08180E-04 | 2.35350E-05 |
| R6 | -1.84881E+01 | -2.61270E-03 | 9.26920E-04 | -1.83660E-04 | 1.56540E-05 |
| R7 | -5.12851E+00 | 2.52510E-03 | -5.73740E-04 | 3.42900E-05 | 4.76530E-06 |
| R8 | -4.51267E+00 | 1.61290E-02 | -2.93210E-03 | 2.90120E-04 | -1.14330E-05 |

TABLE 18-continued

| | | | | |
|---|---|---|---|---|
| R9 | 1.50779E−01 | 2.42390E−02 | −4.98620E−03 | 5.88960E−04 | −3.03600E−05 |
| R10 | 8.98769E+01 | 2.81100E−03 | −4.80320E−04 | 4.75700E−05 | −2.07800E−06 |
| R11 | −1.31032E+00 | 2.82490E−06 | −1.61360E−07 | 5.15790E−09 | −7.00680E−11 |
| R12 | 5.53473E+00 | 2.43520E−06 | −1.18580E−07 | 3.21090E−09 | −3.67660E−11 |

Table 19 and Table 20 show design data of inflection points and arrest points of each lens of the camera optical lens 50 according to the fifth embodiment of the present disclosure.

TABLE 19

| | The number of inflection points | Inflection point position 1 | Inflection point position 2 |
|---|---|---|---|
| P1R1 | 0 | / | / |
| P1R2 | 0 | / | / |
| P2R1 | 1 | 1.605 | / |
| P2R2 | 1 | 1.055 | / |
| P3R1 | 0 | / | / |
| P3R2 | 1 | 0.915 | / |
| P4R1 | 2 | 1.235 | 1.705 |
| P4R2 | 1 | 1.885 | / |
| P5R1 | 1 | 1.405 | / |
| P5R2 | 2 | 0.205 | 1.065 |
| P6R1 | 2 | 1.375 | 3.315 |
| P6R2 | 2 | 0.805 | 3.665 |

TABLE 20

| | The number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 1 | 1.505 | / |
| P3R1 | 0 | / | / |
| P3R2 | 1 | 1.495 | / |
| P4R1 | 1 | 1.615 | / |
| P4R2 | 0 | / | / |
| P5R1 | 1 | 1.955 | / |
| P5R2 | 2 | 0.355 | 1.405 |
| P6R1 | 1 | 2.555 | / |
| P6R2 | 1 | 1.465 | / |

Figure 18:
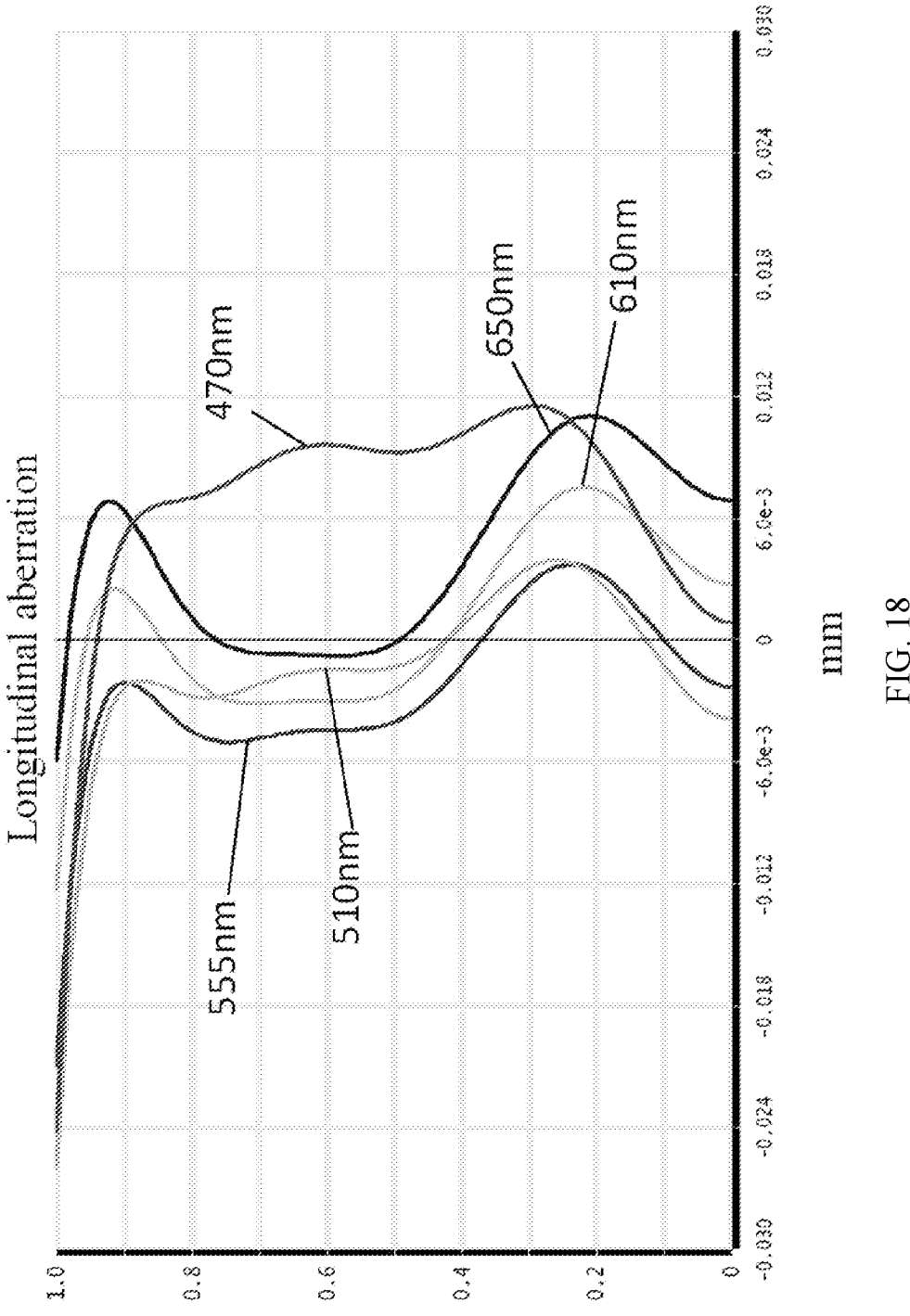
FIG. 18 is a schematic diagram of longitudinal aberration of the camera optical lens shown in FIG. 17.
Figure 19:
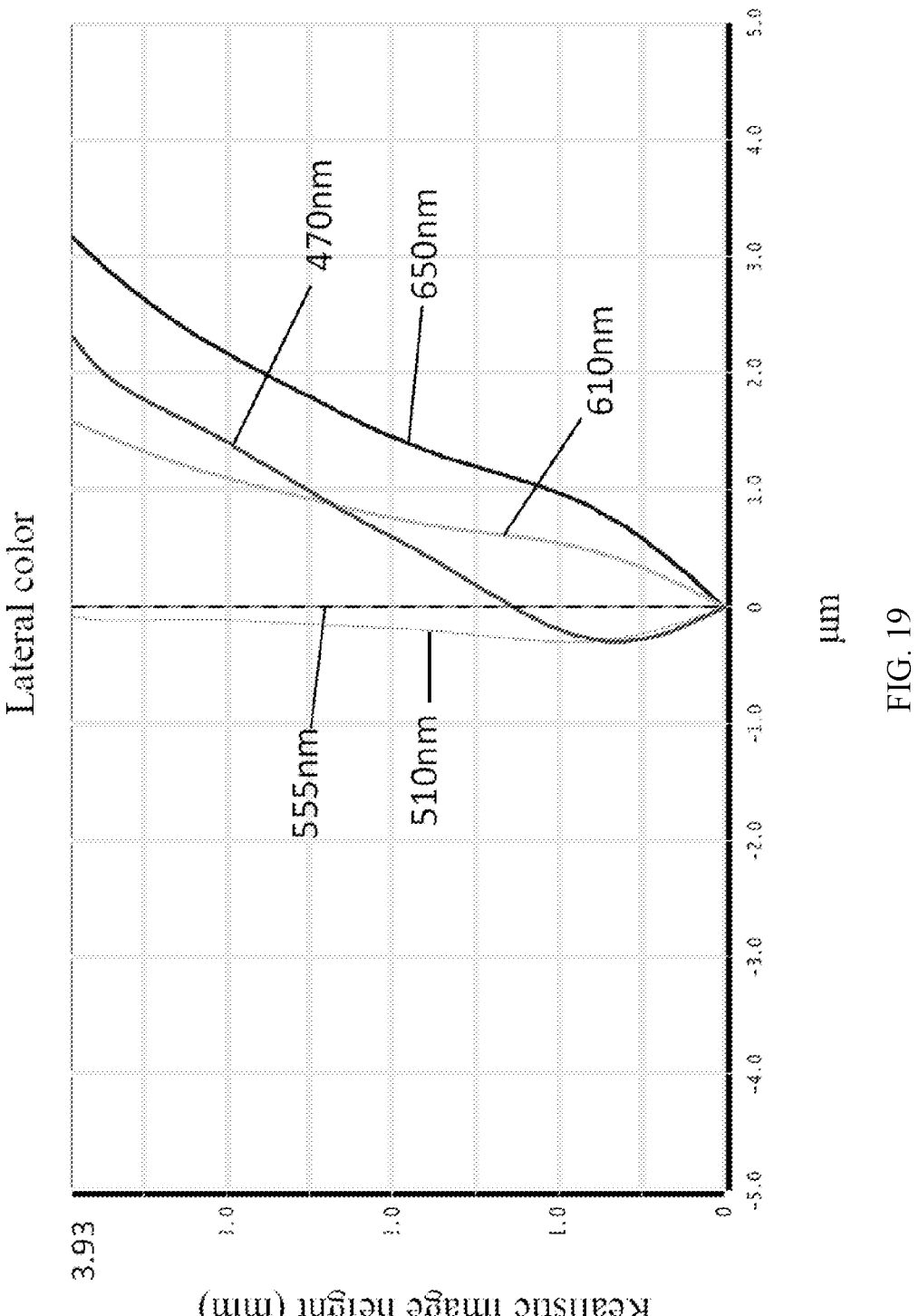
FIG. 19 is a schematic diagram of lateral color of the camera optical lens shown in FIG. 17.
Figure 20:
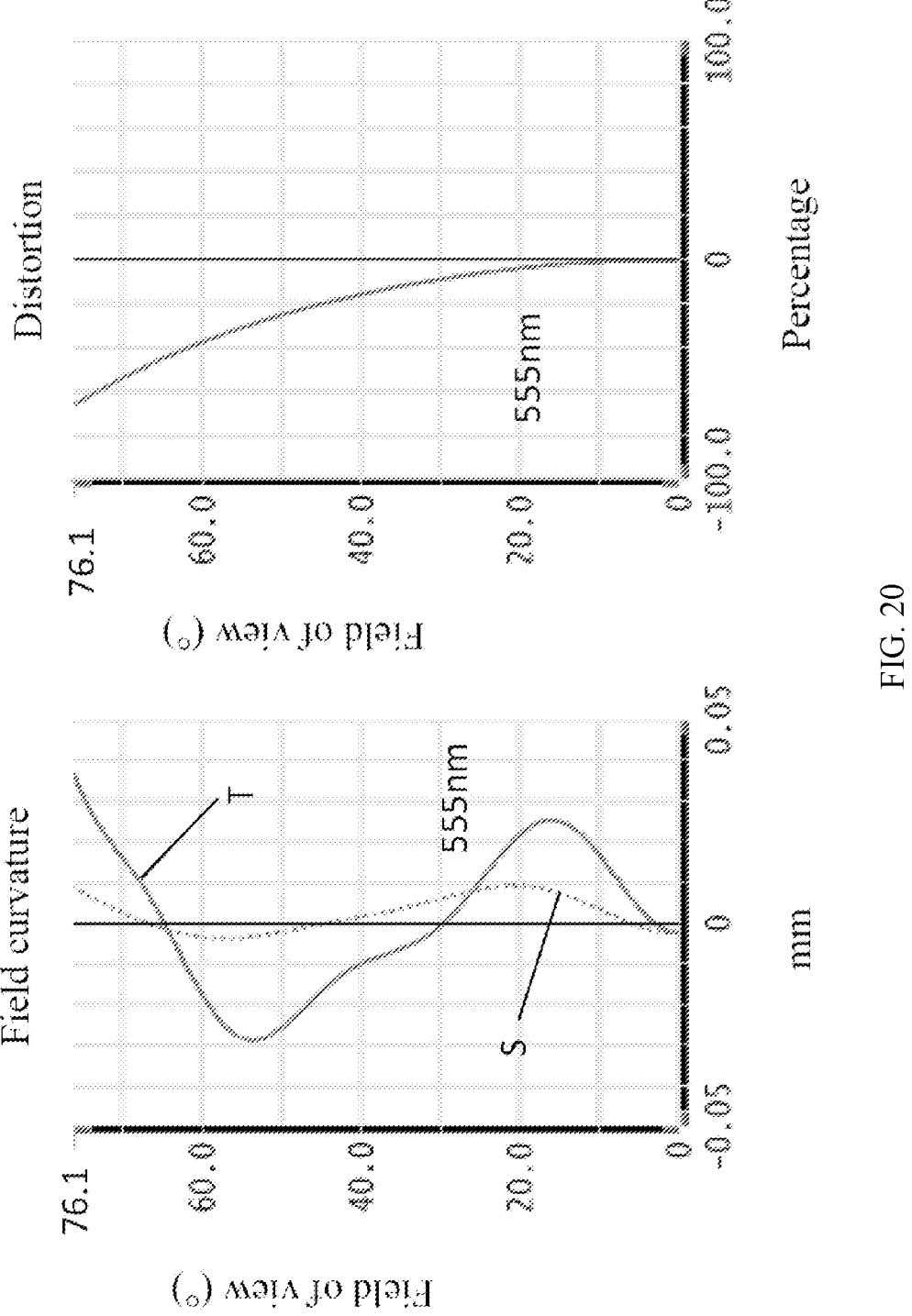
FIG. 20 is a schematic diagram of field curvature and distortion of the camera optical lens shown in FIG. 17.

FIG. 18 and FIG. 19 show schematic diagrams of a longitudinal aberration and a lateral color of light with wavelengths of 650 nm, 610 nm, 555 nm, 510 nm and 470 nm after passing through the camera optical lens 50 according to the fifth embodiment, respectively. FIG. 20 shows a field curvature and a distortion of light with a wavelength of 555 nm after passing through the camera optical lens 50 according to the fifth embodiment. The field curvature S in FIG. 20 is a field curvature in a sagittal direction, and the field curvature T is a field curvature in a meridian direction.

As shown in Table 29, the fifth embodiment satisfies each conditional.

In this embodiment, the entrance pupil diameter ENPD of the camera optical lens 50 is 1.191 mm, the full-field image height IH is 3.930 mm, and the field of view FOV in the diagonal direction is 152.23°. The camera optical lens 50 meets the design requirements of large aperture, ultra-wide-angle, and miniaturization, the on-axis and off-axis lateral color/aberration thereof are sufficiently corrected, and it has excellent optical characteristics.

Sixth Embodiment

The sixth embodiment is substantially the same as the first embodiment, and the meanings of reference signs are the same as those of the first embodiment. Only differences are listed below.

Figure 21:
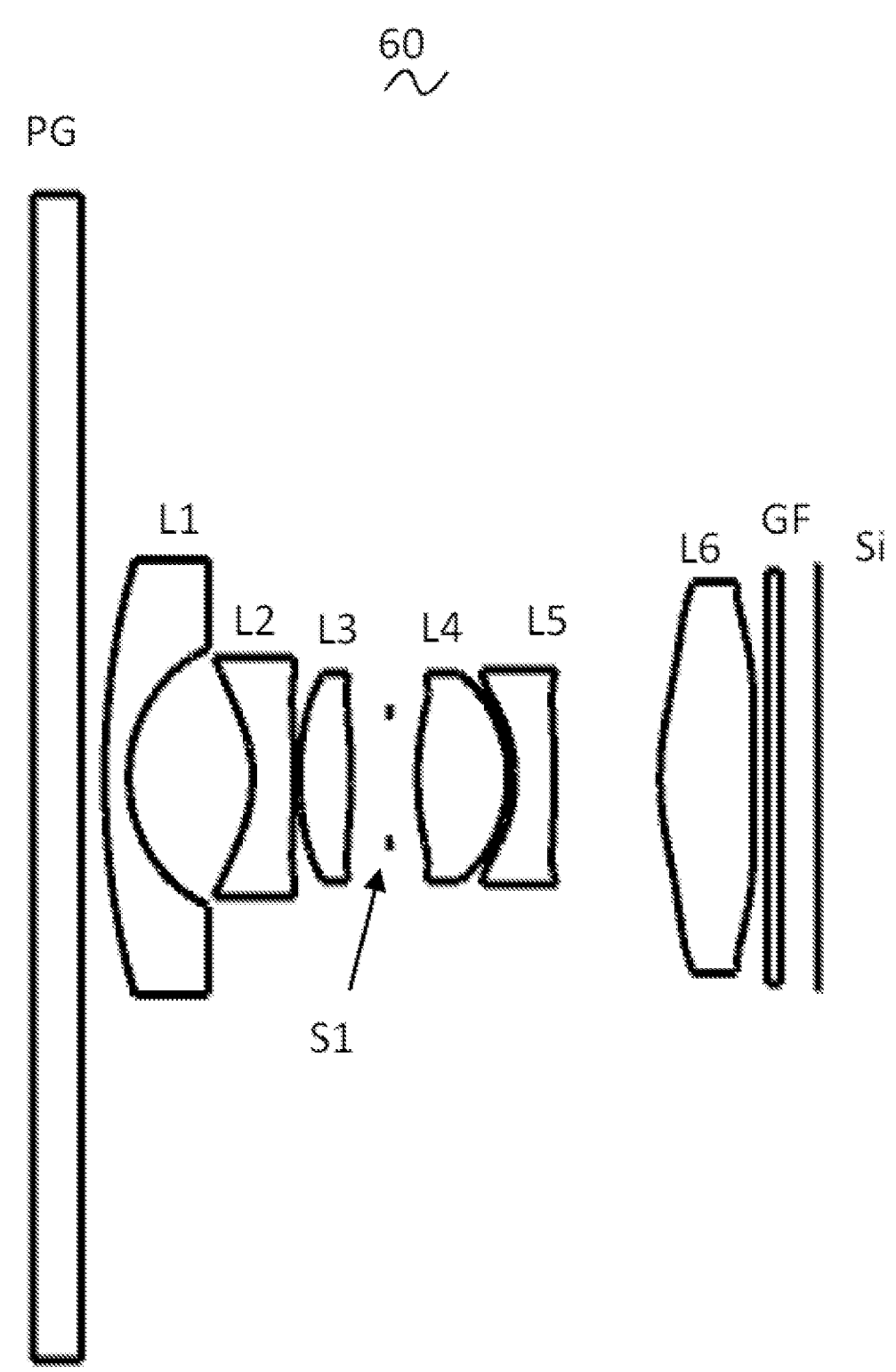
FIG. 21 is a structural schematic diagram of a camera optical lens according to a sixth embodiment of the present disclosure.

FIG. 21 shows a camera optical lens 60 according to the sixth embodiment of the present disclosure.

Table 21 and Table 22 show design data of the camera optical lens 60 according to the sixth embodiment of the present disclosure.

TABLE 21

| | R | | d | | nd | | vd |
|---|---|---|---|---|---|---|---|
| R0 | ∞ | T0= | 1.000 | ndg1 | 1.5168 | vg1 | 64.17 |
| R01 | ∞ | T01= | 0.500 | | | | |
| S1 | ∞ | d0= | −5.923 | | | | |
| R1 | 13.267 | d1= | 0.499 | nd1 | 1.6936 | v1 | 49.23 |
| R2 | 2.530 | d2= | 2.578 | | | | |
| R3 | −2.114 | d3= | 0.872 | nd2 | 1.5444 | v2 | 55.82 |
| R4 | −8.377 | d4= | 0.104 | | | | |
| R5 | 5.467 | d5= | 1.077 | nd3 | 1.8017 | v3 | 40.63 |
| R6 | −7.092 | d6= | 1.383 | | | | |
| R7 | 5.484 | d7= | 1.873 | nd4 | 1.5444 | v4 | 55.82 |
| R8 | −2.324 | d8= | 0.143 | | | | |
| R9 | −3.256 | d9= | 0.815 | nd5 | 1.6700 | v5 | 19.39 |
| R10 | 24.251 | d10= | 2.209 | | | | |
| R11 | 4.052 | d11= | 1.948 | nd6 | 1.5444 | v6 | 55.82 |
| R12 | 29.490 | d12= | 0.279 | | | | |
| R13 | ∞ | d13= | 0.300 | ndg2 | 1.5168 | vg2 | 64.17 |
| R14 | ∞ | d14= | 0.773 | | | | |

Table 22 shows aspheric surface data of each lens of the camera optical lens 60 according to the sixth embodiment of the present disclosure.

TABLE 22

| | Conic coefficient | Aspheric coefficient | | | | |
|---|---|---|---|---|---|---|
| | k | A4 | A6 | A8 | A10 | A12 |
| R3 | −2.32772E+00 | 1.40680E−02 | −1.14870E−02 | 5.60850E−03 | −1.41950E−03 | 1.51160E−04 |
| R4 | −1.08276E+02 | 4.62530E−02 | −8.61020E−02 | 9.13270E−02 | −6.39080E−02 | 3.11580E−02 |
| R5 | −4.27114E+00 | 5.08110E−02 | −8.21520E−02 | 9.31260E−02 | −7.15600E−02 | 3.81280E−02 |
| R6 | −1.79224E+01 | 1.07100E−02 | −3.52540E−03 | 3.91900E−03 | −4.53280E−03 | 4.29040E−03 |
| R7 | −6.74372E+00 | 1.63140E−02 | −2.73050E−03 | −3.39940E−03 | 5.69940E−03 | −5.39390E−03 |
| R8 | −5.20239E+00 | −1.28320E−01 | 1.77330E−01 | −1.79140E−01 | 1.20480E−01 | −5.45340E−02 |

TABLE 22-continued

| | | | | | |
|---|---|---|---|---|---|
| R9 | 2.26653E−01 | −1.62600E−01 | 2.31170E−01 | −2.24710E−01 | 1.56170E−01 | −7.50810E−02 |
| R10 | −9.03576E+01 | −7.66170E−02 | 7.02810E−02 | −4.84550E−02 | 2.68810E−02 | −1.05720E−02 |
| R11 | −3.15808E+00 | −1.33110E−02 | 3.06680E−03 | −9.08610E−04 | 2.05980E−04 | −3.02410E−05 |
| R12 | 3.38016E+01 | −1.20470E−02 | 3.33200E−03 | −1.11770E−03 | 2.36090E−04 | −3.04090E−05 |

| | Conic coefficient | Aspheric coefficient | | | |
|---|---|---|---|---|---|
| | k | A14 | A16 | A18 | A20 |
| R3 | −2.32772E+00 | 2.64670E−05 | −1.37100E−05 | 2.22260E−06 | −1.32910E−07 |
| R4 | −1.08276E+02 | −1.02480E−02 | 2.15870E−03 | −2.63930E−04 | 1.42630E−05 |
| R5 | −4.27114E+00 | −1.36190E−02 | 3.10290E−03 | −4.08010E−04 | 2.35420E−05 |
| R6 | −1.79224E+01 | −2.56460E−03 | 9.32150E−04 | −1.88820E−04 | 1.62100E−05 |
| R7 | −6.74372E+00 | 2.54280E−03 | −5.88120E−04 | 3.83090E−05 | 4.03440E−06 |
| R8 | −5.20239E+00 | 1.61170E−02 | −2.93140E−03 | 2.90530E−04 | −1.15110E−05 |
| R9 | 2.26653E−01 | 2.42450E−02 | −4.98650E−03 | 5.88840E−04 | −3.03280E−05 |
| R10 | −9.03576E+01 | 2.81670E−03 | −4.80270E−04 | 4.71870E−05 | −2.03240E−06 |
| R11 | −3.15808E+00 | 2.82520E−06 | −1.61490E−07 | 5.14660E−09 | −7.00820E−11 |
| R12 | 3.38016E+01 | 2.43760E−06 | −1.18770E−07 | 3.21900E−09 | −3.67130E−11 |

Table 23 and Table 24 show design data of inflection points and arrest points of each lens of the camera optical lens 60 according to the sixth embodiment of the present disclosure.

TABLE 23

| | The number of inflection points | Inflection point position 1 | Inflection point position 2 | Inflection point position 3 |
|---|---|---|---|---|
| P1R1 | 0 | / | / | / |
| P1R2 | 0 | / | / | / |
| P2R1 | 2 | 1.865 | 1.925 | / |
| P2R2 | 3 | 1.015 | 1.815 | 1.895 |
| P3R1 | 0 | / | / | / |
| P3R2 | 1 | 0.955 | / | / |
| P4R1 | 1 | 1.235 | / | / |
| P4R2 | 1 | 1.915 | / | / |
| P5R1 | 1 | 1.475 | / | / |
| P5R2 | 2 | 0.225 | 1.105 | / |
| P6R1 | 2 | 1.485 | 2.575 | / |
| P6R2 | 2 | 0.535 | 2.945 | / |

TABLE 24

| | The number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 1 | 1.425 | / |
| P3R1 | 0 | / | / |
| P3R2 | 1 | 1.555 | / |
| P4R1 | 1 | 1.585 | / |
| P4R2 | 0 | / | / |
| P5R1 | 0 | / | / |
| P5R2 | 2 | 0.405 | 1.465 |
| P6R1 | 0 | / | / |
| P6R2 | 2 | 0.995 | 3.495 |

Figure 22:
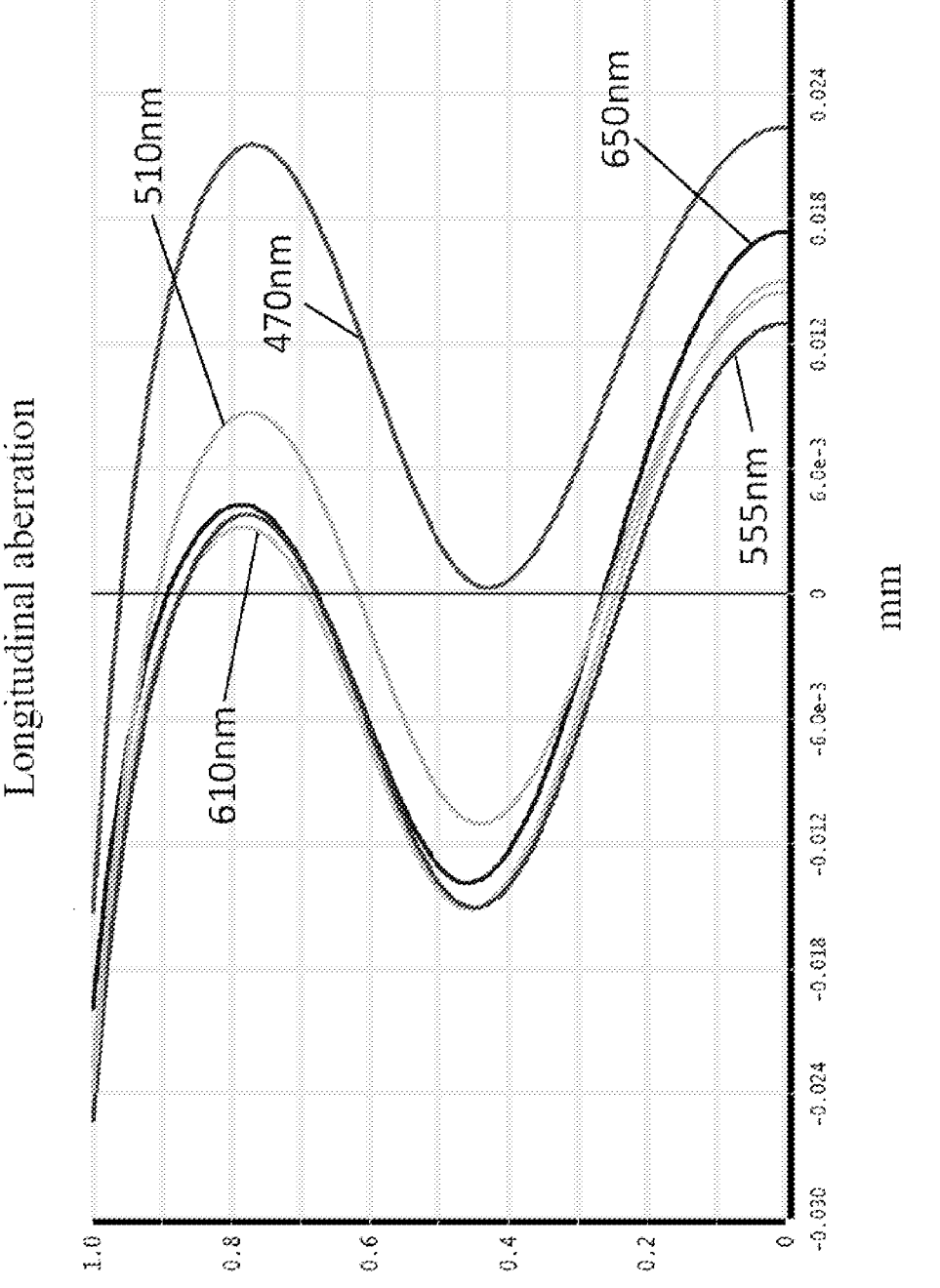
FIG. 22 is a schematic diagram of longitudinal aberration of the camera optical lens shown in FIG. 21.
Figure 23:
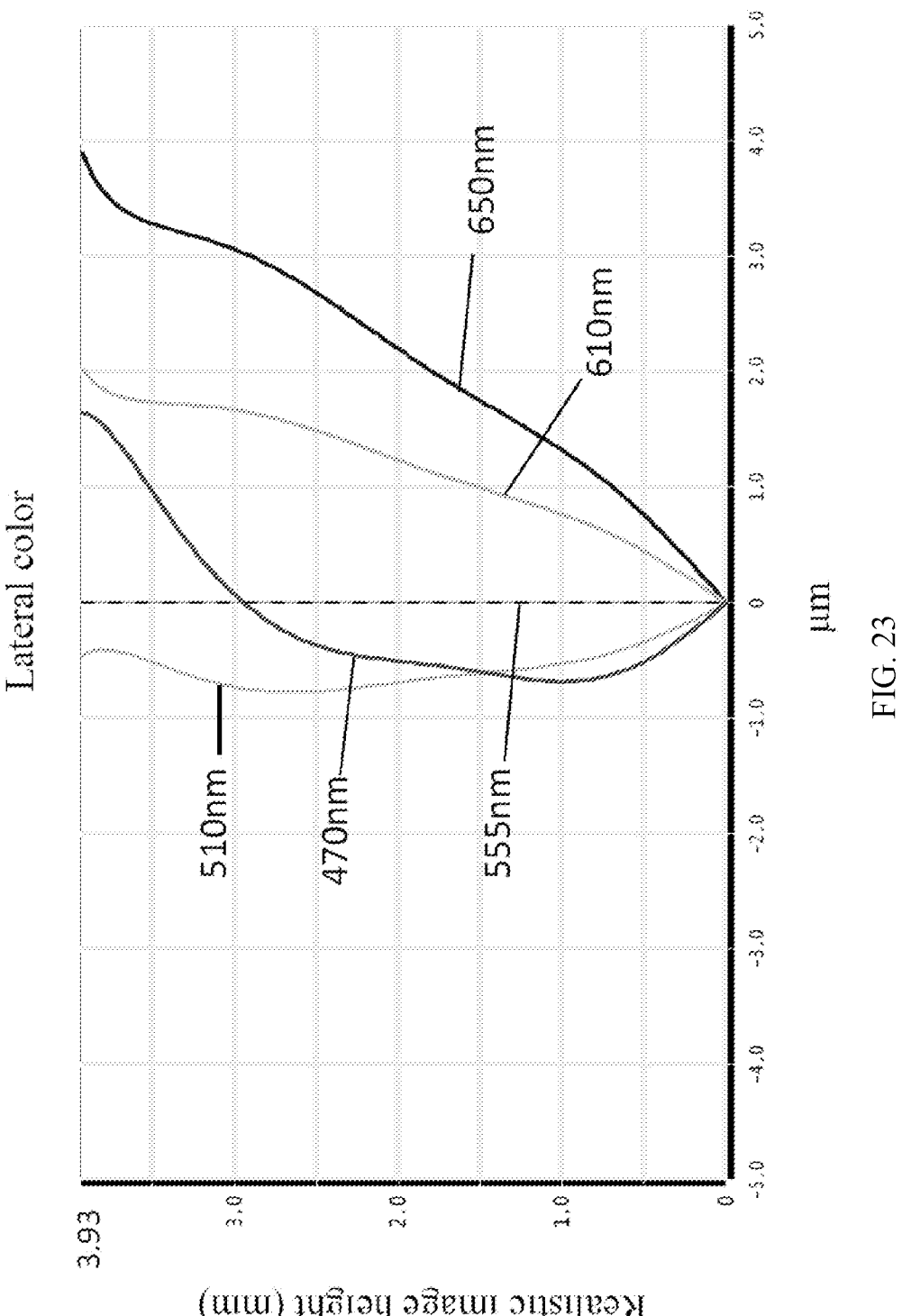
FIG. 23 is a schematic diagram of lateral color of the camera optical lens shown in FIG. 21.
Figure 24:
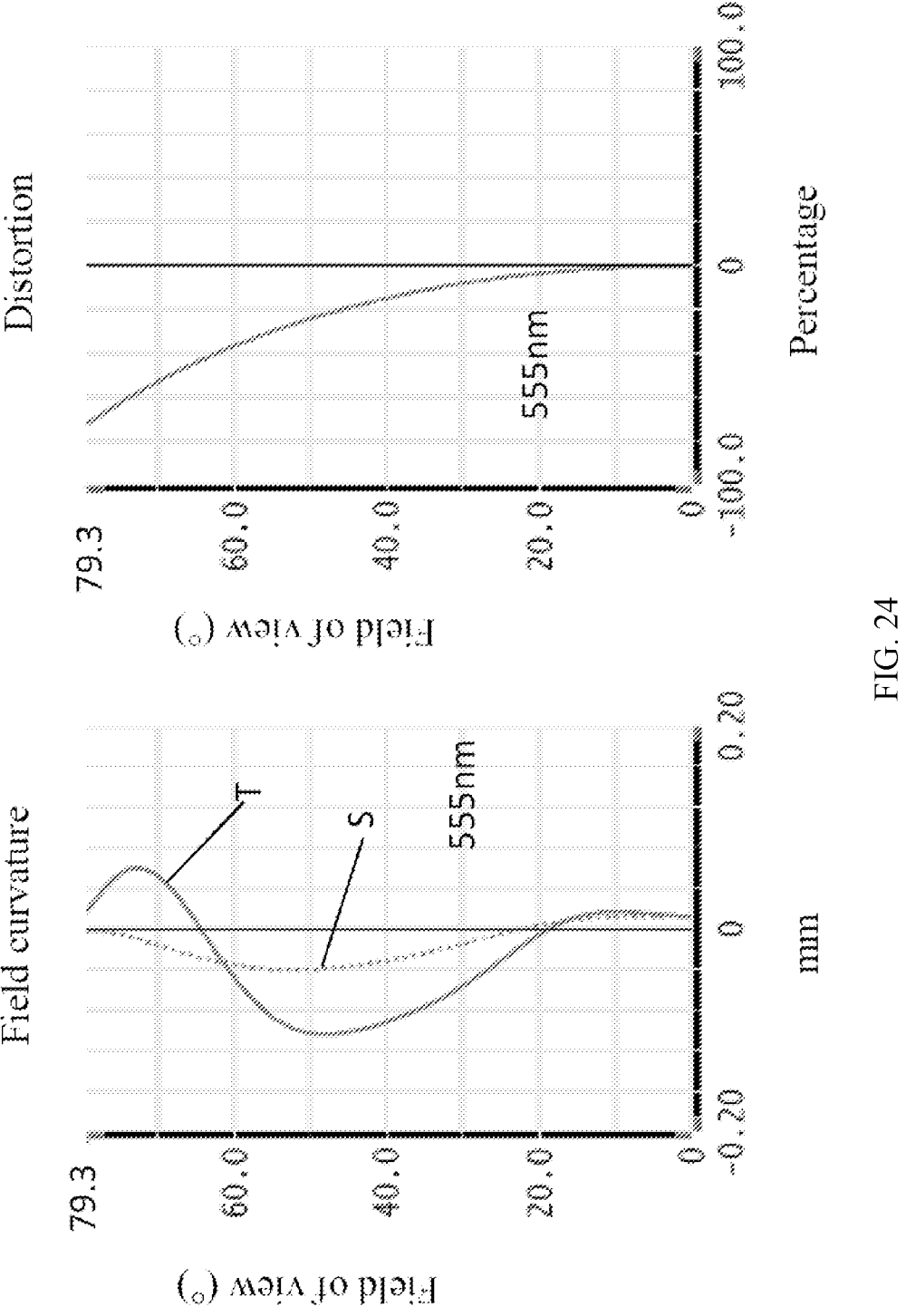
FIG. 24 is a schematic diagram of field curvature and distortion of the camera optical lens shown in FIG. 21.

FIG. 22 and FIG. 23 show schematic diagrams of a longitudinal aberration and a lateral color of light with wavelengths of 650 nm, 610 nm, 555 nm, 510 nm and 470 nm after passing through the camera optical lens 60 according to the sixth embodiment, respectively. FIG. 24 shows a field curvature and a distortion of light with a wavelength of 555 nm after passing through the camera optical lens 60 according to the sixth embodiment. The field curvature S in FIG. 24 is a field curvature in a sagittal direction, and the field curvature T is a field curvature in a meridian direction.

As shown in Table 29, the sixth embodiment satisfies each conditional.

In this embodiment, the entrance pupil diameter ENPD of the camera optical lens 60 is 1.111 mm, the full-field image height IH is 3.930 mm, and the field of view FOV in the diagonal direction is 158.56°. The camera optical lens 60 meets the design requirements of large aperture, ultra-wide-angle, and miniaturization, the on-axis and off-axis lateral color/aberration thereof are sufficiently corrected, and it has excellent optical characteristics.

Comparative Embodiment

The meanings of reference signs of the comparative embodiment are the same as those of the first embodiment. Only differences are listed below.

Figure 25:
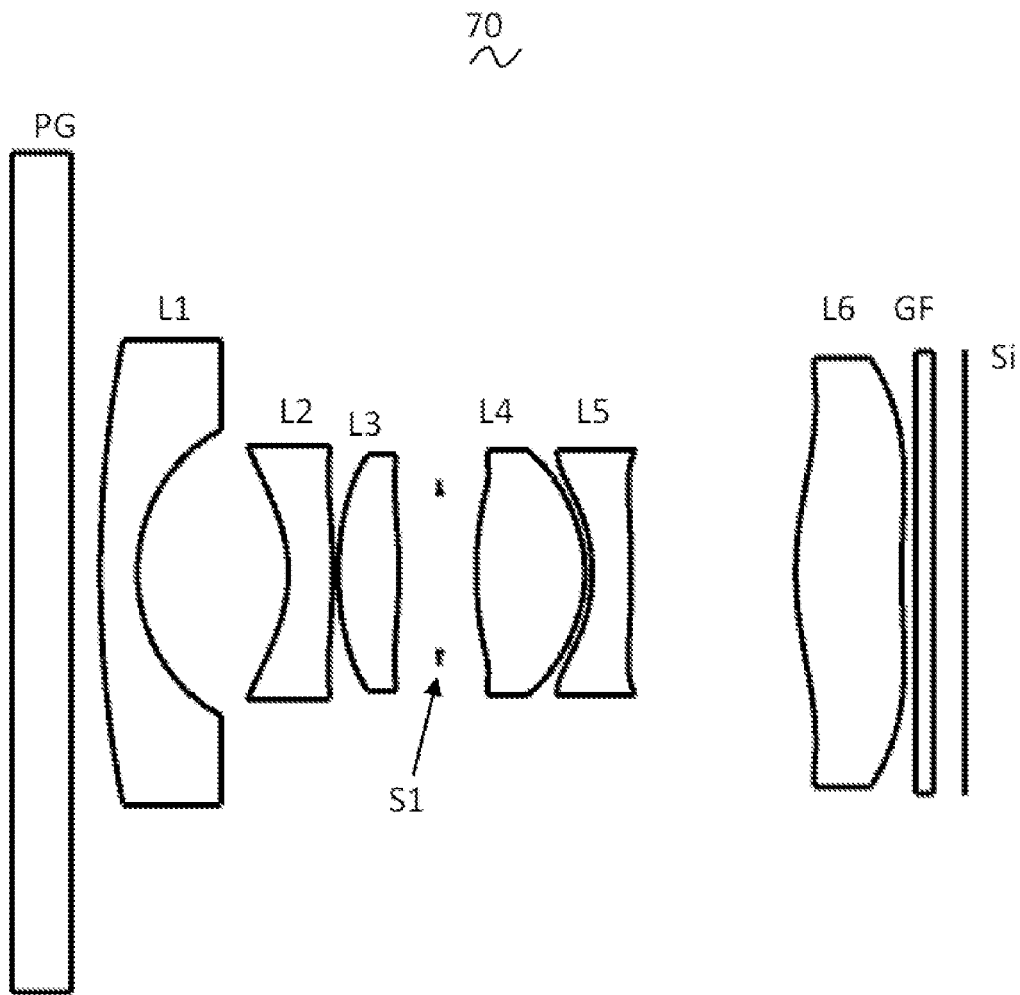
FIG. 25 is a structural schematic diagram of a camera optical lens according to a comparative embodiment.

FIG. 25 shows a camera optical lens 70 according to the comparative embodiment.

Table 25 and Table 26 show design data of the camera optical lens 70 according to the comparative embodiment.

TABLE 25

| | R | | d | | nd | | vd |
|---|---|---|---|---|---|---|---|
| R0 | ∞ | T0= | 1.000 | ndg1 | 1.5168 | vg1 | 64.17 |
| R01 | ∞ | T01= | 0.500 | | | | |
| S1 | ∞ | d0= | −5.791 | | | | |
| R1 | 17.544 | d1= | 0.635 | nd1 | 1.6936 | v1 | 49.23 |
| R2 | 2.526 | d2= | 2.579 | | | | |
| R3 | −2.077 | d3= | 0.759 | nd2 | 1.5444 | v2 | 55.82 |
| R4 | −6.564 | d4= | 0.097 | | | | |
| R5 | 5.157 | d5= | 1.030 | nd3 | 1.8017 | v3 | 40.63 |
| R6 | −7.232 | d6= | 1.322 | | | | |
| R7 | 6.062 | d7= | 1.854 | nd4 | 1.5444 | v4 | 55.82 |
| R8 | −2.286 | d8= | 0.121 | | | | |
| R9 | −3.301 | d9= | 0.654 | nd5 | 1.6700 | v5 | 19.39 |
| R10 | 33.434 | d10= | 2.823 | | | | |
| R11 | 4.521 | d11= | 1.811 | nd6 | 1.5444 | v6 | 55.82 |
| R12 | 10.721 | d12= | 0.243 | | | | |
| R13 | ∞ | d13= | 0.300 | ndg2 | 1.5168 | vg2 | 64.17 |
| R14 | ∞ | d14= | 0.532 | | | | |

Table 26 shows aspheric surface data of each lens of the camera optical lens 70 according to the comparative embodiment.

TABLE 26

| | Conic coefficient | Aspheric coefficient | | | | |
|---|---|---|---|---|---|---|
| | k | A4 | A6 | A8 | A10 | A12 |
| R3 | −2.35879E+00 | 1.29330E−02 | −1.08480E−02 | 5.55620E−03 | −1.40300E−03 | 1.34150E−04 |
| R4 | −8.06776E+01 | 4.33030E−02 | −8.49610E−02 | 9.11900E−02 | −6.40350E−02 | 3.11560E−02 |
| R5 | −2.60254E+00 | 5.23800E−02 | −8.24740E−02 | 9.31020E−02 | −7.16060E−02 | 3.81400E−02 |
| R6 | −1.81446E+01 | 1.29940E−02 | −3.34550E−03 | 4.00210E−03 | −4.83110E−03 | 4.47180E−03 |
| R7 | −5.35510E+00 | 1.83260E−02 | −3.64200E−03 | −3.16990E−03 | 5.71090E−03 | −5.41560E−03 |
| R8 | −4.59334E+00 | −1.23630E−01 | 1.77950E−01 | −1.79470E−01 | 1.20550E−01 | −5.45660E−02 |
| R9 | 1.31495E−01 | −1.61400E−01 | 2.31300E−01 | −2.24310E−01 | 1.56120E−01 | −7.50690E−02 |
| R10 | 9.00139E+01 | −7.52550E−02 | 7.08390E−02 | −4.86890E−02 | 2.69920E−02 | −1.05770E−02 |
| R11 | −9.51169E−01 | −1.47240E−02 | 2.84620E−03 | −9.04560E−04 | 2.05910E−04 | −3.02900E−05 |
| R12 | 5.67151E+00 | −1.75760E−02 | 3.61000E−03 | −1.12650E−03 | 2.35050E−04 | −3.03740E−05 |

| | Conic coefficient | Aspheric coefficient | | | |
|---|---|---|---|---|---|
| | k | A14 | A16 | A18 | A20 |
| R3 | −2.35879E+00 | 3.31360E−05 | −1.47550E−05 | 2.23600E−06 | −1.27200E−07 |
| R4 | −8.06776E+01 | −1.02330E−02 | 2.15990E−03 | −2.65140E−04 | 1.43770E−05 |
| R5 | −2.60254E+00 | −1.36270E−02 | 3.10630E−03 | −4.08180E−04 | 2.35390E−05 |
| R6 | −1.81446E+01 | −2.61240E−03 | 9.27370E−04 | −1.83560E−04 | 1.56870E−05 |
| R7 | −5.35510E+00 | 2.52360E−03 | −5.73910E−04 | 3.42940E−05 | 4.80580E−06 |
| R8 | −4.59334E+00 | 1.61290E−02 | −2.93210E−03 | 2.90140E−04 | −1.14290E−05 |
| R9 | 1.31495E−01 | 2.42390E−02 | −4.98620E−03 | 5.88970E−04 | −3.03590E−05 |
| R10 | 9.00139E+01 | 2.81120E−03 | −4.80270E−04 | 4.75770E−05 | −2.07530E−06 |
| R11 | −9.51169E−01 | 2.82480E−06 | −1.61290E−07 | 5.15380E−09 | −7.02250E−11 |
| R12 | 5.67151E+00 | 2.43590E−06 | −1.18630E−07 | 3.21020E−09 | −3.66690E−11 |

Table 27 and Table 28 show design data of inflection points and arrest points of each lens of the camera optical lens 70 according to the comparative embodiment.

TABLE 27

| | The number of inflection points | Inflection point position 1 | Inflection point position 2 | Inflection point position 3 |
|---|---|---|---|---|
| P1R1 | 0 | / | / | / |
| P1R2 | 0 | / | / | / |
| P2R1 | 2 | 1.635 | 1.865 | / |
| P2R2 | 3 | 1.075 | 1.835 | 1.895 |
| P3R1 | 0 | / | / | / |
| P3R2 | 1 | 0.875 | / | / |
| P4R1 | 2 | 1.235 | 1.715 | / |
| P4R2 | 1 | 1.875 | / | / |
| P5R1 | 2 | 1.385 | 1.985 | / |
| P5R2 | 2 | 0.195 | 1.045 | / |
| P6R1 | 3 | 1.425 | 3.245 | 4.205 |
| P6R2 | 2 | 0.775 | 3.565 | / |

TABLE 28

| | The number of arrest points | Arrest point position 1 | Arrest point position 2 | Arrest point position 3 |
|---|---|---|---|---|
| P1R1 | 0 | / | / | / |
| P1R2 | 0 | / | / | / |
| P2R1 | 0 | / | / | / |
| P2R2 | 1 | 1.535 | / | / |
| P3R1 | 0 | / | / | / |
| P3R2 | 1 | 1.455 | / | / |
| P4R1 | 1 | 1.595 | / | / |

TABLE 28-continued

| | The number of arrest points | Arrest point position 1 | Arrest point position 2 | Arrest point position 3 |
|---|---|---|---|---|
| P4R2 | 0 | / | / | / |
| P5R1 | 1 | 1.905 | / | / |
| P5R2 | 2 | 0.345 | 1.395 | / |
| P6R1 | 3 | 2.695 | 3.525 | 4.365 |
| P6R2 | 1 | 1.425 | / | / |

Figure 26:
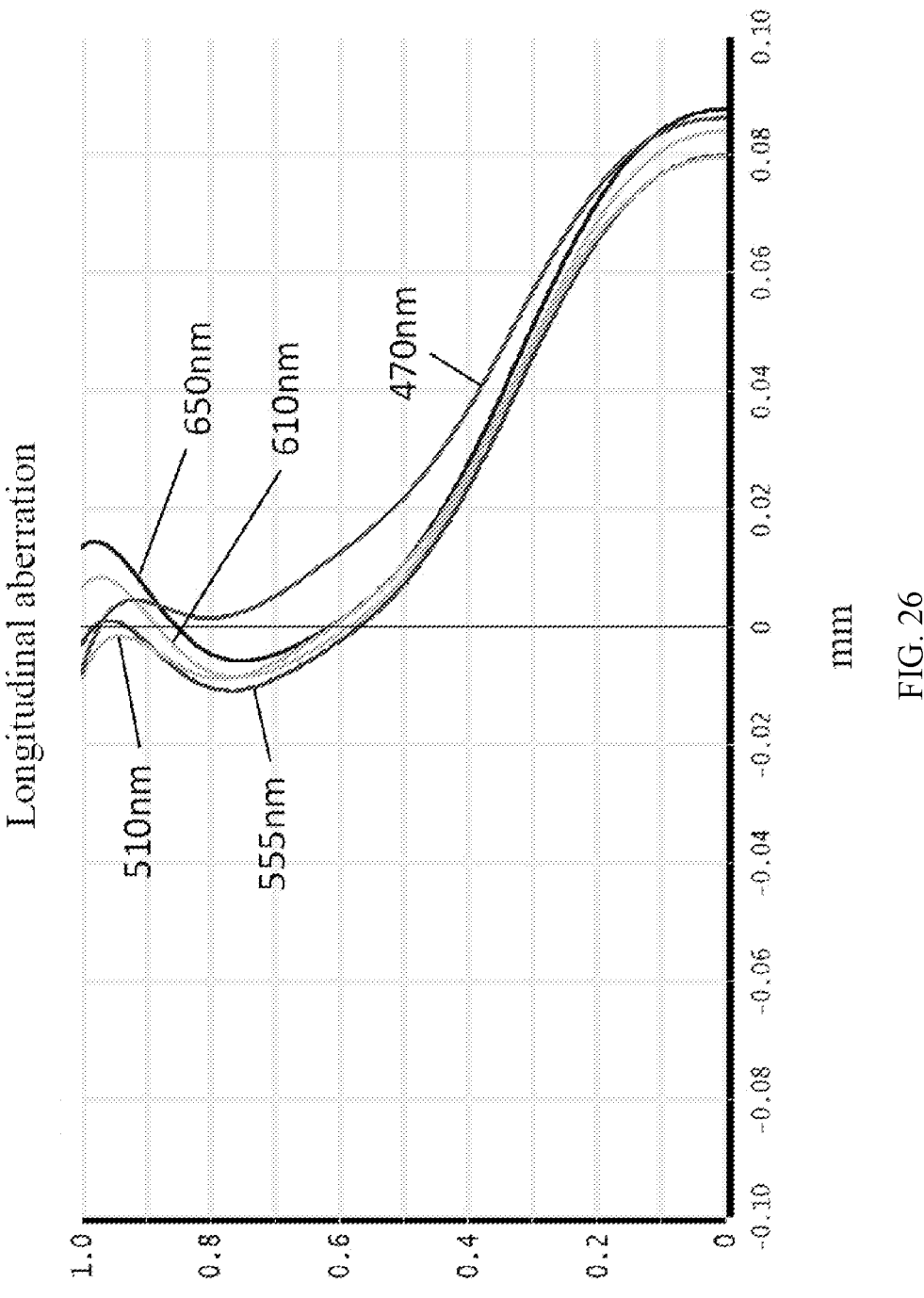
FIG. 26 is a schematic diagram of longitudinal aberration of the camera optical lens shown in FIG. 25.
Figure 27:
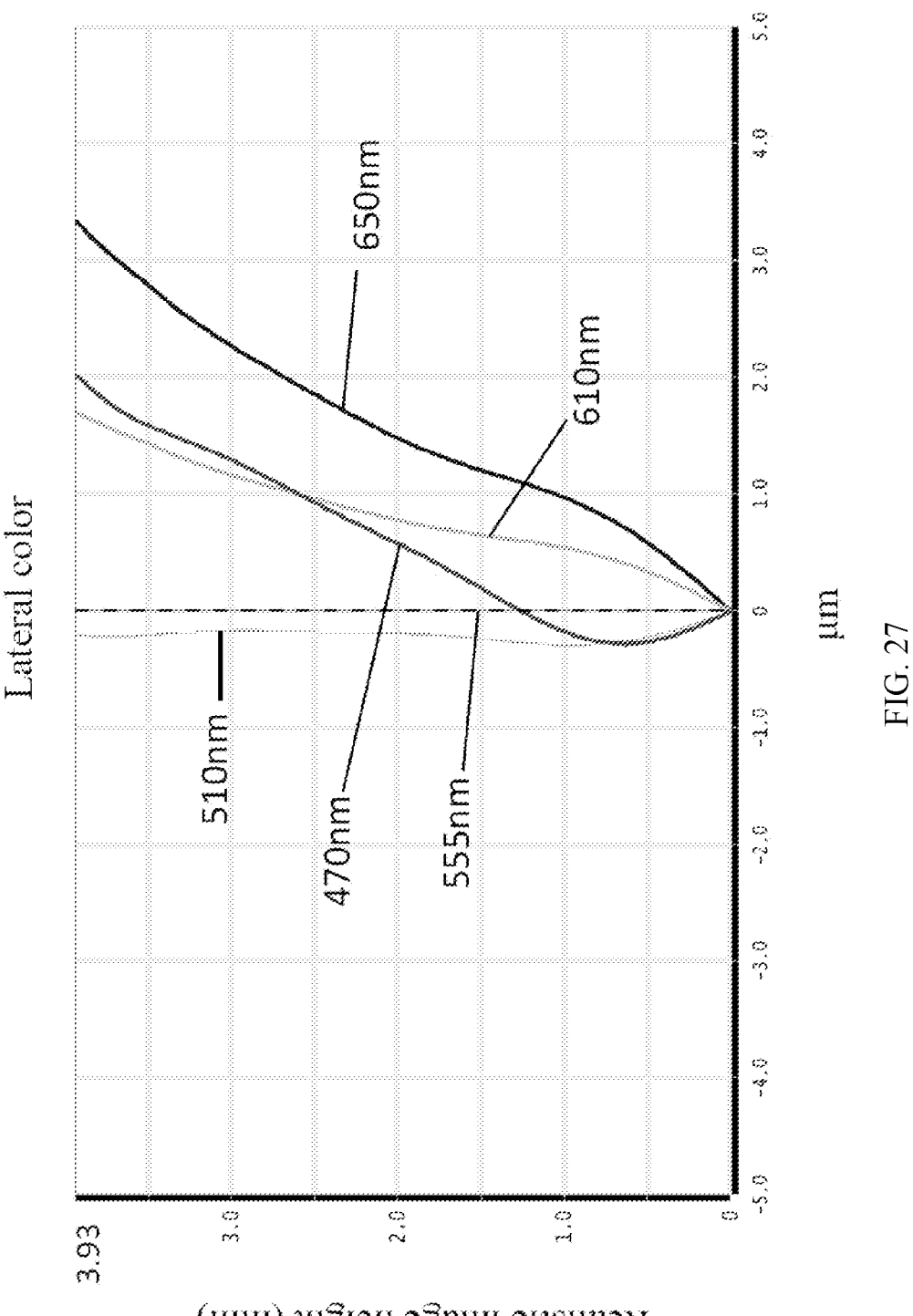
FIG. 27 is a schematic diagram of lateral color of the camera optical lens shown in FIG. 25.
Figure 28:
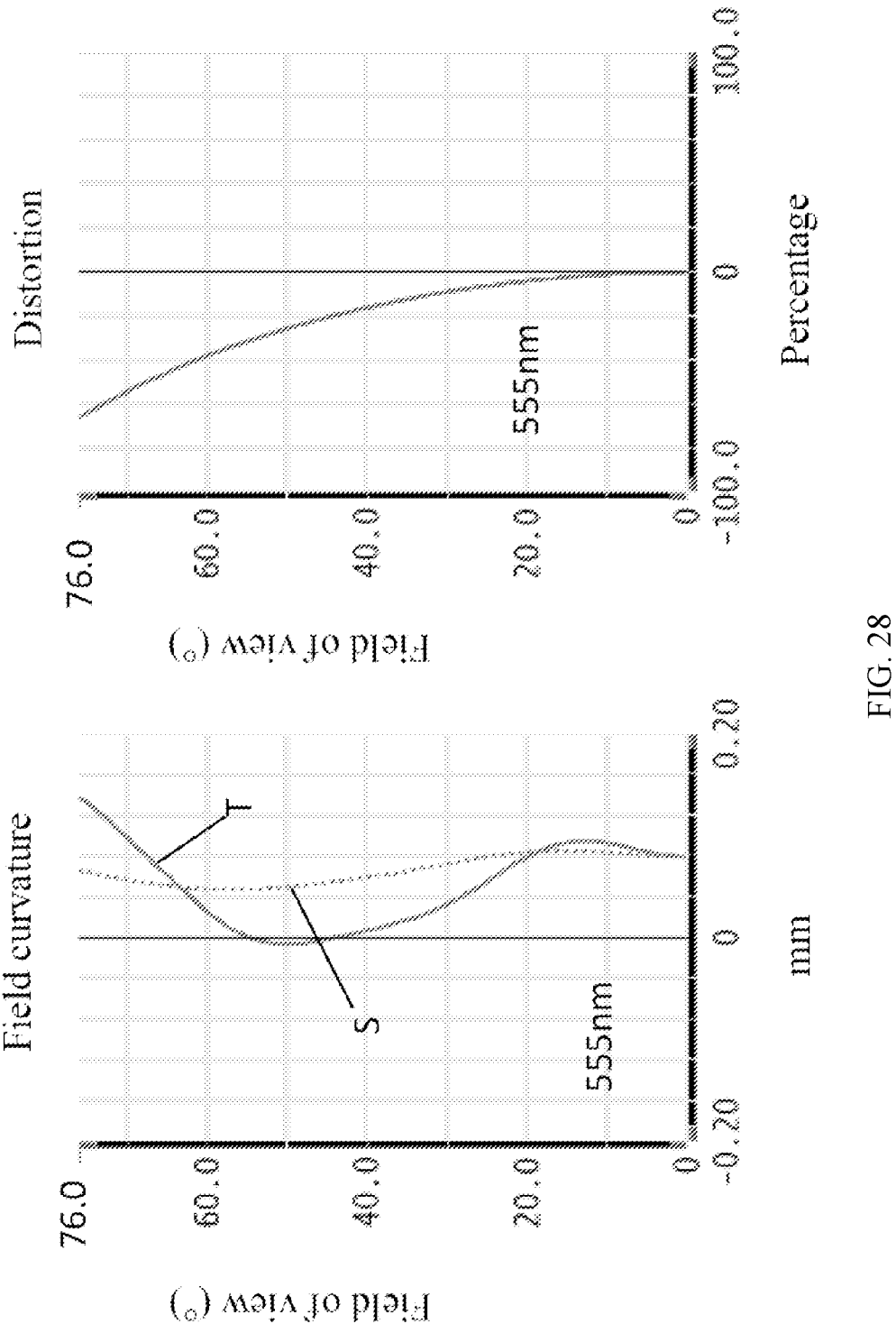
FIG. 28 is a schematic diagram of field curvature and distortion of the camera optical lens shown in FIG. 25.

FIG. 26 and FIG. 27 show schematic diagrams of a longitudinal aberration and a lateral color of light with wavelengths of 650 nm, 610 nm, 555 nm, 510 nm and 470 nm after passing through the camera optical lens 70 according to the comparative embodiment, respectively. FIG. 28 shows a field curvature and a distortion of light with a wavelength of 555 nm after passing through the camera optical lens 70 according to the comparative embodiment. The field curvature S in FIG. 28 is a field curvature in a sagittal direction, and the field curvature T is a field curvature in a meridian direction.

The following Table 29 lists the values corresponding to each conditional in the comparative embodiment according to the above conditionals. It is appreciated that, the camera optical lens 70 of the comparative embodiment does not satisfy the above conditional 1.30≤d10/d9≤4.00.

In the comparative embodiment, the entrance pupil diameter ENPD of the camera optical lens 70 is 1.215 mm, the full-field image height IH is 3.930 mm, and the field of view FOV in the diagonal direction is 152.00°. The camera optical lens 70 does not meet the design requirements of large aperture, ultra-wide-angle, and miniaturization.

TABLE 29

| Parameter and conditional | Embodiment 1 | Embodiment 2 | Embodiment 3 | Embodiment 4 | Embodiment 5 | Embodiment 6 | Comparative embodiment |
|---|---|---|---|---|---|---|---|
| n3 | 1.802 | 1.802 | 1.702 | 2.066 | 1.802 | 1.802 | 1.802 |
| f2/f1 | 1.400 | 1.036 | 1.970 | 1.434 | 1.368 | 1.189 | 1.372 |
| d10/d9 | 2.690 | 1.315 | 1.514 | 2.024 | 3.947 | 2.711 | 4.319 |

TABLE 29-continued

| Parameter and conditional | Embodiment 1 | Embodiment 2 | Embodiment 3 | Embodiment 4 | Embodiment 5 | Embodiment 6 | Comparative embodiment |
|---|---|---|---|---|---|---|---|
| R4/R3 | 3.024 | 2.303 | 1.702 | 2.830 | 3.055 | 3.963 | 3.160 |
| TTL/(IH*FOV) | 0.025 | 0.030 | 0.028 | 0.020 | 0.025 | 0.024 | 0.026 |
| (R11 + R12)/ (R11 − R12) | −1.633 | −2.331 | −3.499 | −1.637 | −2.500 | −1.319 | −2.459 |
| f3/f | 1.303 | 1.101 | 1.380 | 1.101 | 1.360 | 1.495 | 1.332 |
| f | 2.969 | 3.514 | 3.203 | 2.751 | 2.858 | 2.667 | 2.916 |
| f1 | −4.366 | −6.48 | −5.745 | −4.219 | −4.41 | −4.577 | −4.314 |
| f2 | −6.112 | −6.716 | −11.319 | −6.05 | −6.033 | −5.444 | −5.918 |
| f3 | 3.869 | 3.869 | 4.421 | 3.029 | 3.888 | 3.986 | 3.883 |
| f4 | 3.359 | 3.755 | 3.679 | 3.419 | 3.29 | 3.265 | 3.298 |
| f5 | −4.118 | −4.093 | −3.913 | −4.024 | −4.369 | −4.195 | −4.412 |
| f6 | 9.838 | 10.412 | 14.562 | 9.606 | 13.075 | 8.374 | 12.977 |
| FNO | 2.400 | 2.400 | 2.399 | 2.400 | 2.399 | 2.400 | 2.400 |
| TTL | 14.811 | 14.369 | 14.981 | 12.606 | 14.706 | 14.853 | 14.760 |
| IH | 3.930 | 3.930 | 3.930 | 3.930 | 3.930 | 3.930 | 3.930 |
| FOV | 150.62 | 121.88 | 136.60 | 159.64 | 152.23 | 158.56 | 152.00 |

Those skilled in the art can understand that the above embodiments are specific embodiments for implementing the present disclosure, and in practical applications, various changes may be made in form and detail without departing from the spirit and scope of the present disclosure.

What is claimed is:

1. A camera optical lens, comprising from an object side to an image side:

a first lens having negative refractive power, a second lens having negative refractive power, a third lens having positive refractive power, a fourth lens having positive refractive power, a fifth lens having negative refractive power, and a sixth lens having positive refractive power; wherein the first lens is made of glass material, and the third lens is made of glass material;

wherein a refractive index of the third lens is n3, a focal length of the first lens is f1, a focal length of the second lens is f2, an on-axis thickness of the fifth lens is d9, an on-axis distance from an image-side surface of the fifth lens to an object-side surface of the sixth lens is d10, a central curvature radius of an object-side surface of the second lens is R3, a central curvature radius of an image-side surface of the second lens is R4, a total track length of the camera optical lens is TTL, an image height of the camera optical lens is IH, a field of view of the camera optical lens is FOV, and following relations are satisfied:

$$n3 \geq 1.70;$$

$$1.00 \leq f2/f1 \leq 2.00;$$

$$1.30 \leq d10/d9 \leq 4.00;$$

$$1.70 \leq R4/R3 \leq 4.00; \text{ and}$$

$$0.02 \leq TTL/(IH * FOV) \leq 0.03.$$

2. The camera optical lens as described in claim 1, wherein a central curvature radius of the object-side surface of the sixth lens is R11, a central curvature radius of an image-side surface of the sixth lens is R12, and a following relation is satisfied:

$$-3.50 \leq (R11 + R12)/(R11 - R12) \leq -1.30.$$

3. The camera optical lens as described in claim 1, wherein a focal length of the camera optical lens is f, a focal length of the third lens is f3, and a following relation is satisfied:

$$1.10 \leq f3/f \leq 1.50.$$

4. The camera optical lens as described in claim 1, an object-side surface of the first lens is convex at a paraxial position, and an image-side surface of the first lens is concave at the paraxial position;

a focal length of the camera optical lens is f, a central curvature radius of the object-side surface of the first lens is R1, a central curvature radius of the image-side surface of the first lens is R2, an on-axis thickness of the first lens is d1, and following relations are satisfied:

$$-3.69 \leq f1/f \leq -0.98;$$

$$0.52 \leq (R1 + R2)/(R1 - R2) \leq 2.29; \text{ and}$$

$$0.02 \leq d1/TTL \leq 0.16.$$

5. The camera optical lens as described in claim 1, wherein the object-side surface of the second lens is concave at a paraxial position, and the image-side surface of the second lens is convex at the paraxial position;

a focal length of the camera optical lens is f, an on-axis thickness of the second lens is d3, and following relations are satisfied:

$$-7.07 \leq f2/f \leq -1.27;$$

$$-7.70 \leq (R3 + R4)/(R3 - R4) \leq -1.12; \text{ and}$$

$$0.02 \leq d3/TTL \leq 0.09.$$

6. The camera optical lens as described in claim 1, wherein an object-side surface of the third lens is convex at a paraxial position, and an image-side surface of the third lens is convex at the paraxial position;

a central curvature radius of the object-side surface of the third lens is R5, a central curvature radius of the image-side surface of the third lens is R6, an on-axis thickness of the third lens is d5, and following relations are satisfied:

$$-0.44 \le (R5 + R6)/(R5 - R6) \le -0.05; \text{ and}$$

$$0.03 \le d5/TTL \le 0.12.$$

7. The camera optical lens as described in claim 1, wherein an object-side surface of the fourth lens is convex at a paraxial position, and an image-side surface of the fourth lens is convex at the paraxial position;

a focal length of the camera optical lens is f, a focal length of the fourth lens is f4, a central curvature radius of the object-side surface of the fourth lens is R7, a central curvature radius of the image-side surface of the fourth lens is R8, an on-axis thickness of the fourth lens is d7, and following relations are satisfied:

$$0.53 \le f4/f \le 1.86;$$

$$0.20 \le (R7 + R8)/(R7 - R8) \le 0.69;$$

$$0.06 \le d7/TTL \le 0.20.$$

8. The camera optical lens as described in claim 1, wherein an object-side surface of the fifth lens is concave at a paraxial position, and the image-side surface of the fifth lens is concave at the paraxial position;

a focal length of the camera optical lens is f, a focal length of the fifth lens is f5, a central curvature radius of the object-side surface of the fifth lens is R9, a central curvature radius of the image-side surface of the fifth lens is R10, and following relations are satisfied:

$$-3.15 \le f5/f \le -0.78;$$

$$-1.73 \le (R9 + R10)/(R9 - R10) \le -0.51;$$

$$0.02 \le d9/TTL \le 0.11.$$

9. The camera optical lens as described in claim 1, wherein the object-side surface of the sixth lens is convex at a paraxial position, and an image-side surface of the sixth lens is concave at the paraxial position;

a focal length of the camera optical lens is f, a focal length of the sixth lens is f6, an on-axis thickness of the sixth lens is d11, and following relations are satisfied:

$$1.48 \le f6/f \le 6.86;$$

$$0.06 \le d11/TTL \le 0.22.$$

10. The camera optical lens as described in claim 1, wherein a field of view of the camera optical lens is FOV, and a following relation is satisfied:

$$FOV \ge 120°.$$

* * * * *